(12) United States Patent
Mori et al.

(10) Patent No.: US 6,210,147 B1
(45) Date of Patent: Apr. 3, 2001

(54) METHOD OF AND APPARATUS FOR SHAPING FIBROUS ELASTIC BODY

(75) Inventors: Takayasu Mori, Toyota; Masafumi Nomura, Iwakura; Masanao Yamaguchi, Ibaraki, all of (JP)

(73) Assignees: Araco Kabushiki Kaisha; Teijin Limited, both of (JP)

( * ) Notice: Subject to any disclaimer, the term of this patent is extended or adjusted under 35 U.S.C. 154(b) by 0 days.

(21) Appl. No.: 09/129,014

(22) Filed: Aug. 4, 1998

(30) Foreign Application Priority Data

Aug. 5, 1997 (JP) ................................... 9-210777
Jan. 21, 1998 (JP) ................................. 10-009746

(51) Int. Cl.⁷ .......................................... A01J 25/12
(52) U.S. Cl. ....................... 425/384; 425/394; 264/120
(58) Field of Search ........................... 264/120; 425/384, 425/394

(56) References Cited

U.S. PATENT DOCUMENTS

| | | |
|---|---|---|
| 3,354,248 | 11/1967 | Haas et al. . |
| 4,418,031 | 11/1983 | Doerer et al. . |
| 4,504,347 * | 3/1985 | Munk et al. ..................... 264/120 |
| 4,648,934 | 3/1987 | Kiss . |
| 5,045,262 * | 9/1991 | Munk ................................ 264/112 |
| 5,494,627 | 2/1996 | Kargol et al. . |

FOREIGN PATENT DOCUMENTS

| | | |
|---|---|---|
| 2140837 | 12/1984 | (GB) . |
| 5-345358 | 12/1993 | (JP) . |
| 6-190160 | 7/1994 | (JP) . |
| 6-192952 | 7/1994 | (JP) . |
| 6-280149 | 10/1994 | (JP) . |
| 7-222882 | 8/1995 | (JP) . |
| 8-226055 | 9/1996 | (JP) . |
| 9-084972 | 3/1997 | (JP) . |
| 9-084973 | 3/1997 | (JP) . |
| 9-085759 | 3/1997 | (JP) . |
| 9-111628 | 4/1997 | (JP) . |
| 9-176946 | 7/1997 | (JP) . |

* cited by examiner

Primary Examiner—Mary Lynn Theisen
(74) Attorney, Agent, or Firm—Patterson, Thuente, Skaar & Christensen, P.A.

(57) ABSTRACT

This invention relates to an apparatus and method for shaping fibrous elastic bodies. The apparatus includes a preliminary shaping die and a final shaping die. A fiber material, which includes a binder fiber and a matrix fiber, is used to form the elastic bodies. The binder fiber has a lower melting point than the matrix fiber. The fiber material is placed into the preliminary shaping die and half melted to bond the unmelted matrix fiber and thereby form the preliminary shaped item. The preliminary shaped item has a preliminary shape of an objective article to be shaped. The preliminary shaped item is then transferred to the final shaping die, in which it is further heated and clamped to shape the objective article.

18 Claims, 20 Drawing Sheets

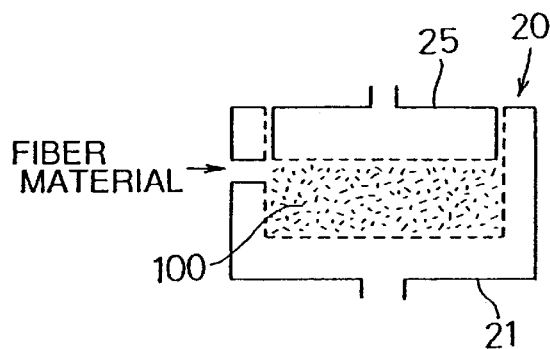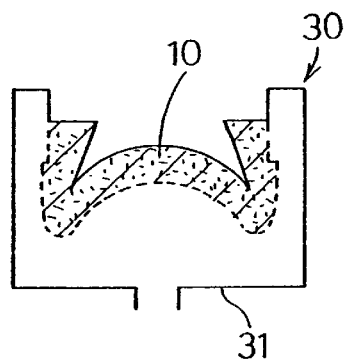
FIG.1 (a)     FIG.1 (d)
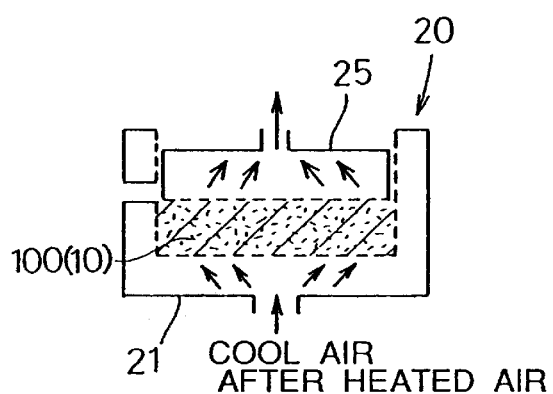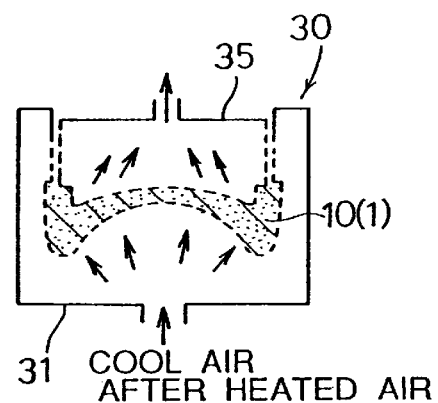
FIG.1 (b)     FIG.1 (e)
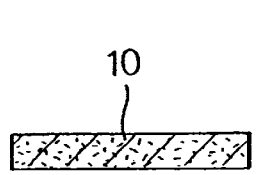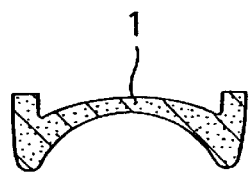
FIG.1 (c)     FIG.1 (f)

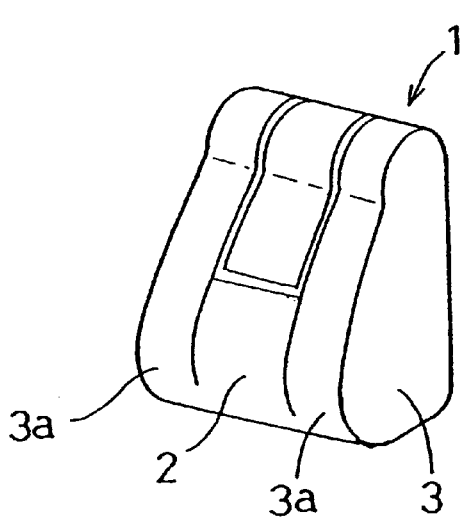
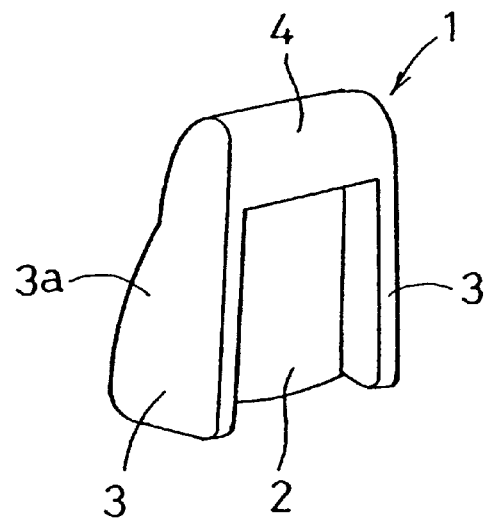
FIG.2 (a)  FIG.2 (b)
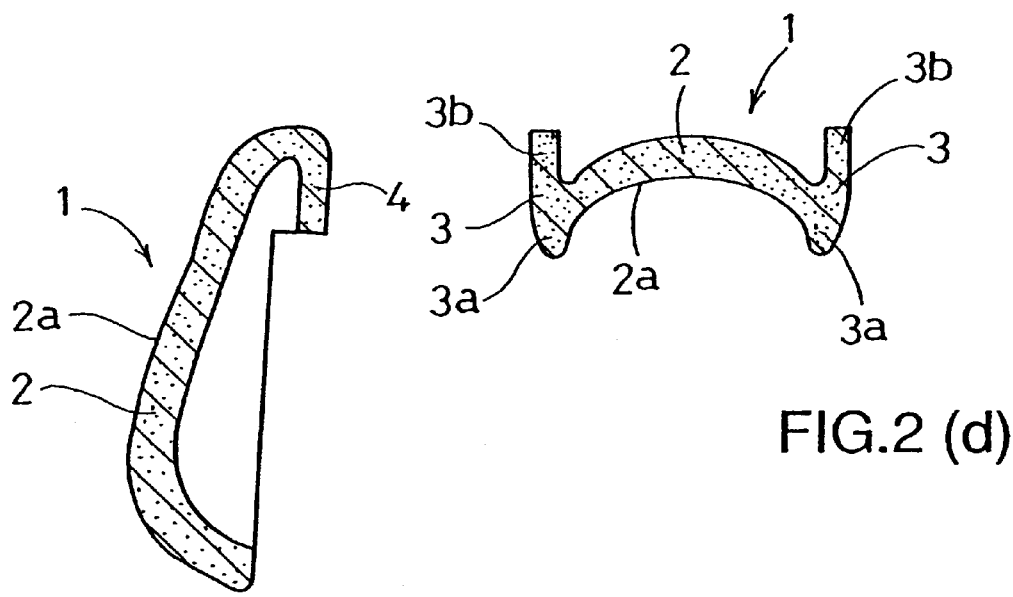
FIG.2 (c)  FIG.2 (d)

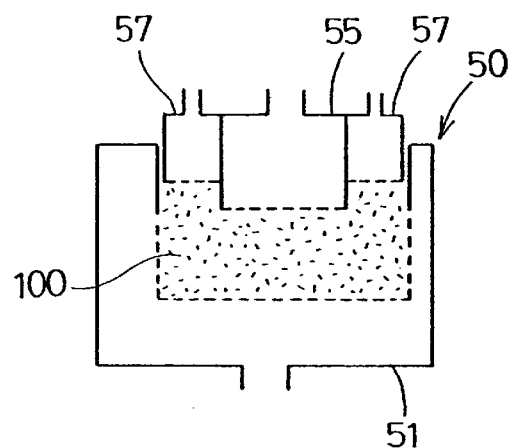
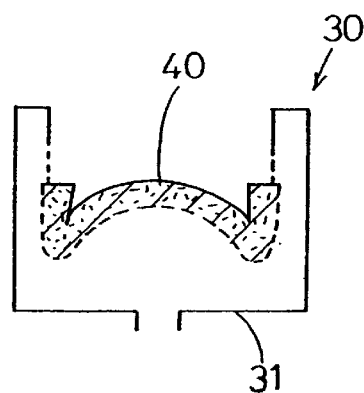
FIG.10 (a)  FIG.10 (d)
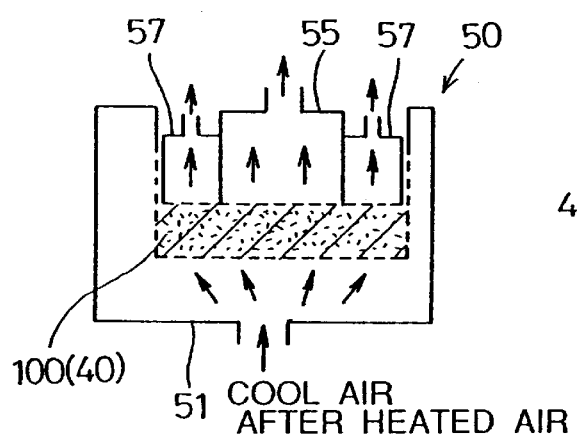
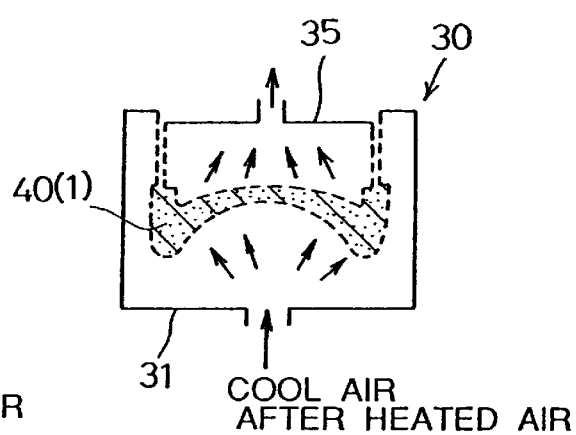
FIG.10 (b)  FIG.10 (e)
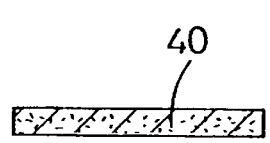
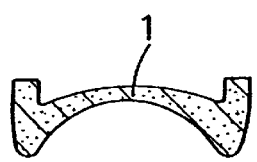
FIG.10 (c)  FIG.10 (f)

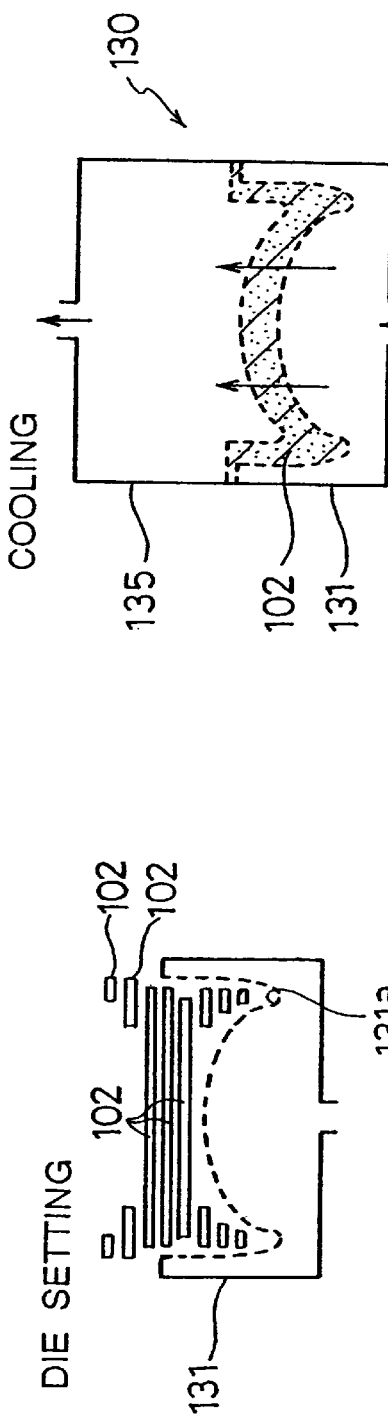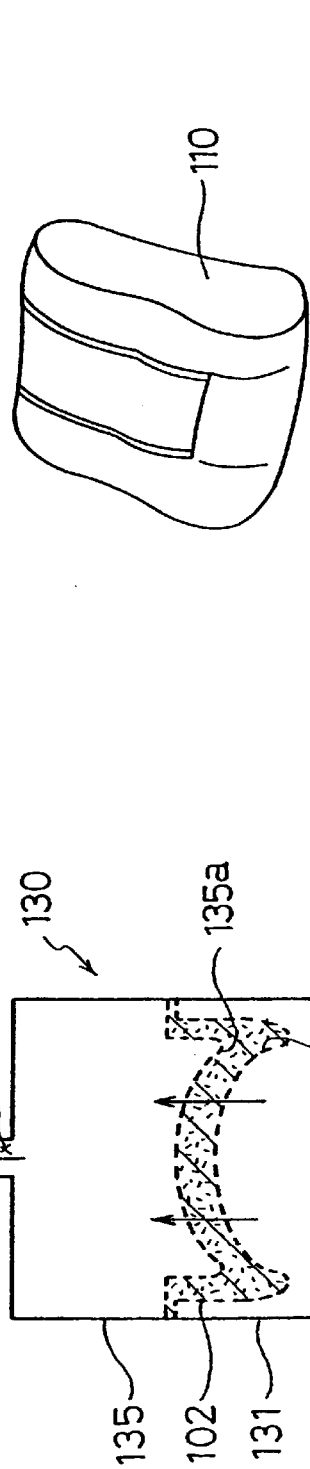
FIG. 14(a) PRIOR ART — DIE SETTING
FIG. 14(b) PRIOR ART — HEATING
FIG. 14(c) PRIOR ART — COOLING
FIG. 14(d) PRIOR ART — REMOVING

RAW MATERIAL

MATRIX FIBER    BINDER FIBER

COTTON BLENDING

FIBRILLATION

MATTING

CUTTING

METHOD OF AND APPARATUS FOR SHAPING FIBROUS ELASTIC BODY

BACKGROUND OF THE INVENTION

1. Field of the Invention

The present invention relates to a method of and an apparatus for shaping a fibrous elastic body which is, for example, used for a seat back pad, a seat cushion pad, or a pad, etc., of a seat for an automobile.

2. Description of the Related Art

Molded polyurethane foam is in popular use, for example, as a material for a seat back pad, a seat cushion pad, etc., of a seat for an automobile. However, in recent years, a fibrous elastic body, due to its excellent recyclability, has attracted more attention than shaped polyurethane foam which is inferior in terms of recyclability. Such a fibrous elastic body is shaped by a laminate shaping technique or a blow shaping technique which will be described below.

First, the laminate shaping technique will be described. Before describing the technique, a technique for shaping a matted fiber material which is used for the laminate shaping technique will be described with reference to the explanatory diagrams in FIG. 15(a) through FIG. 15(e). In FIG. 15(a), a matrix fiber which is made of a polyester fiber and a binder fiber which is made of a polyester fiber which has a lower melting point than that of the matrix fiber are prepared. Next, in FIG. 15(b), the matrix fiber and the binder fiber are cotton-blended. Next, in FIG. 15(c), the cotton-blended fibers are fibrillated (or opened), thereby obtaining a fibrillated fiber material 100. Then, in FIG. 15(d), the fibrillated fiber material 100 is matted, thereby obtaining a matted fiber material 101 which has a certain thickness with a certain density. Next, in FIG. 15(e), the matted fiber material 101 is cut into a predetermined shape, whereby a cut fiber material (or "a fibrous mat material") 102 is obtained. On average, a number of cut-out pieces for a seat back pad is 6 to 8.

Now, a shaping die which is used for laminate type shaping will be described with reference to FIG. 14(a) through FIG. 14(d) which shows the shaping process. A shaping die 130 includes a bottom die 131 and a top die 135 which are approximately box-like in shape. In FIG. 14(a), the top die 135 is omitted. The bottom die 131 and the top die 135 have shaping surfaces 131a and 135a, respectively, which define a predetermined shape, i.e., a cavity of a seat back pad when the shaping die is closed. The respective shaping surfaces 131a and 135a of the bottom die 131 and the top die 135 are formed by a highly breathable punching metal which includes a number of holes. The shaping surface 131a of the bottom die 131 forms a front surface portion of the seat back pad. The shaping surface 135a of the top die 135 forms a back surface portion of the seat back pad. An air supply slot 133 is formed at the bottom surface of the bottom die 131. On the other hand, an exhaust slot 136 is formed at the top surface of the top die 135.

To shape a seat back pad using the shaping die 130 described above by the laminate-type method, in FIG. 14(a), the fibrous mat material 102 described earlier is disposed as a laminate, within the shaping surface 131a of the bottom die 131 which is opened. Next, in FIG. 14(b), the top die 135 is closed over the bottom die 131 to thereby clamp the fibrous mat material 102. In this condition, heated air is force-fed inside the bottom die 131 through the air supply slot 133 of the bottom die 131. After being blown through the fibrous mat material 102, the heated air is discharged outside through the top die 135 at the exhaust slot 136. Heating with the heated air melts the binder fiber which is contained in the fibrous mat material 102, whereby the matrix fiber is shaped into the shape of a seat back pad. Following this, in FIG. 14(c), instead of the heated air, cool air is blown through the fibrous mat material 102 to thereby cool the fibrous mat material 102. This solidifies the melted binder fiber. Next, in FIG. 14(d), the shaping die is opened and the content is removed from the shaping die, whereby a seat back pad 110 is obtained.

Now, the blow shaping technique will be described with reference to the explanatory diagram in FIG. 16. A shaping die 140 which is used in this type of shaping is almost the same as the shaping die which is used in the laminate shaping technique described above, and therefore, identical reference symbols will be assigned to identical or corresponding portions. A redundant description will be omitted, and different portions will be described. The bottom die 131 and the top die 135, as they are opened, are enclosed by a restriction box 141 which is formed by a punching metal. The bottom die 131 includes a material blowing slot 132 which leads to an inner space which is created between the bottom die 131 and the top die 135 as they are opened. Unlike the laminate-type method, the blow-type method uses the fibrillated fiber material 100 which is obtained during the course of shaping of the fibrous mat material 102 (See FIG. 15(c)), instead of using the fibrous mat material 102.

To shape a seat back pad using the shaping die 140 as described above by the blow-type method, in FIG. 16, the inner space between the bottom die 131 and the top die 135 is filled with the fibrillated fiber material 100 by means of air feeding under a pressure feed force, that is, air blown, through the material blowing slot 132 of the bottom die 131. Following this, the fibrillated fiber material 100 is clamped, with the top die 135 fit with the bottom die 131. Next, through steps which are similar to the shaping process of the laminate-type method (See FIG. 14(b) through FIG. 14(d)), the seat back pad 110 is obtained.

The laminate shaping technique described above, requiring to set the fibrous mat material 102 inside the shaping die 130 depending on necessity, ensures an advantage that it is possible to shape a material which has a complex shape including a vertical wall portion, a pocketform portion, etc., without creating any significant defective shape due to density shortage or filling shortage. Another advantage is that it is possible to set a non-woven fabric, a pendant wire and the like, which are to be attached to the back surface of the seat cushion pad 110, in the shaping die 130 together with the fibrous mat material 102 and to simultaneously shape them.

However, in the laminate shaping technique, in order to suppress a density change at a joint portion where the fibrous mat material 102 is disposed overlapping, about 6 to 8 cut-out pieces are necessary as described earlier. Hence, it is necessary to cut the matted fiber material 101 and consequently form about 6 to 8 pieces of the fibrous mat material 102, and set the cut fibrous mat materials 102 one after another to the bottom die 131. This creates a problem where productivity is very bad.

Meanwhile, according to the blow shaping technique, since it is not necessary to cut the matted fiber material 101 and set the fibrous mat materials 102 to the bottom die 131, which is required in the laminate shaping technique, the problem of bad productivity is solved. In addition, since the blow shaping technique rarely creates a defective shape due to density shortage and filling shortage if an article to be shaped has a simple shape such as a cubic shape and a rectangular shape, the blow shaping technique is appropriate. However, when an article to be shaped has a complex shape which includes a vertical wall portion, a pocketform portion, etc., the blow shaping technique creates defective shape problem due to density shortage or filling shortage, as will be described in detail below.

Density shortage will be described with reference to the explanatory diagrams in FIG. 17(a) and FIG. 17(b). In FIG. 17(a), a fiber density of the fibrillated fiber material which is filled by blowing into the inner space which is created between the bottom die 131 and the top die 135 as they are opened is approximately constant.

At this stage, it is assumed that a thickness B1 of a general portion of the seat back pad is 3, a thickness A1 of vertical wall portions on the left-hand and the right-hand sides (i.e., portions which include a side support portion and an edge portion of the seat back pad) is 5, and fiber densities of the respective portions are both 1. Assuming that a clamping volume C at clamping of the fiber material with shaping die closed is 2, the thickness A of the vertical wall portions is:

A=(A1−C)/A1=3/5

The fiber density accordingly changes to 5/3. Meanwhile, the thickness B of the general portion is:

B=(B1−C)/B1=1/3

The fiber density accordingly changes to 3. Therefore, the fiber density D1 of the vertical wall portions is as low as 5/9 of the fiber density D2 of the general portion, thereby creating a defective shape due to density shortage. Because of this, with the blow shaping technique, it is difficult to increase the rigidity of the side support portion which demands a higher rigidity, due to a necessity related to side supportability or the like, than in the case of the general portion.

Next, filling shortage is described with reference to the explanatory diagrams in FIGS. 18(a), 18(b) and 18(c). Among the diagrams, FIG. 18(a) is a cross sectional view showing a condition in which the fibrillated fiber material 100 is filled in the shaping die 140, FIG. 18(b) is a cross sectional view showing a condition of the shaping die 140 of FIG. 18(a) as it is closed, and FIG. 18(c) is a cross sectional view showing another example of the shaping die 140. As in the case of the shaping die 140 as that shown in FIG. 18(b) which includes an under portion 134 where the bottom die 131 is in an undercut state with respect to a parting line PL, as shown in FIG. 18(a), since the fibrillated fiber material 100 to be filled in by blowing does not easily reach the under portion 134 of the bottom die 131, filling shortage of the fiber material 100 results. It then follows that even when the die is closed and the fibrillated fiber material 100 is clamped, as shown in FIG. 18(b), it is not possible to avoid a decrease in the density in the under portion 134 of the bottom die 131, which in turn creates a defective shape. Meanwhile, when the parting line PL is set at a position which corresponds to an outer most position of the seat back pad and the under portion 134 is accordingly excluded as shown in FIG. 18(c), a trace of the parting line PL easily appears in a design surface of the seat back pad product. This creates a necessity to post-process the trace, which is an increase in cost and not desirable.

Another example of filling shortage will be described with reference to the explanatory diagrams in FIGS. 19(a) and 19(b). Among the diagrams, FIG. 19(a) is a cross sectional view showing a condition in which the fiber material 100 is filled in the shaping die 140, while FIG. 19(b) is a cross sectional view showing a condition of the shaping die 140 of FIG. 19(a) as it is closed. In FIG. 19(a), when the top shape 135 includes a recess portion 137 which corresponds to a pocketform back lining top portion (or "a pocketform portion") which is formed above the seat back pad, the fibrillated fiber material 100 which is filled in by blowing through the material blowing slot 132 of the bottom die 131 does not easily enter the recess portion 137, which in turn results in filling shortage of the fiber material 100. Therefore, it is not possible to avoid a decrease in the density within the recess portion 137 even though the die is closed and the fibrillated fiber material 100 is clamped, thereby creating a defective shape.

SUMMARY OF THE INVENTION

Accordingly, an object of the present invention is to provide a method of and an apparatus for shaping a fibrous elastic body, with which it is possible to form an objective shaped article with excellent productivity while avoiding a defective shape due to density shortage, filling shortage or the like.

An embodiment of the present invention is directed to a method of and an apparatus for shaping a fibrous elastic body.

The method according to the present invention first requires to fill a fiber material into a preliminary shaping die to shape a preliminary shaped item which has a preliminary shape of an objective article to be shaped. The fiber material contains a binder fiber which thermally melts.

The apparatus according to the present invention comprises a preliminary shaping die for shaping such a preliminary shaped item.

The method according to the present invention requires to fill the preliminary shaped item into a final shaping die, heat up and clamp the preliminary shaped item, to thereby shape the objective article. As a result, a fibrous elastic body is shaped as a final product. As herein termed, the binder fiber is a fiber which melts at a predetermined temperature when heated. The melted binder fiber has a function of infiltrating a fiber material and fixing the shape of a shaped item.

The apparatus according to the present invention comprises a final shaping die for shaping such a final product.

According to a preferred embodiment of the present invention, during shaping of the preliminary shaped item, the preliminary shape of the preliminary shaped item is a shape which corresponds to the objective article as it is developed. That is, a developed shape of the objective article is shaped preliminarily, and the developed shape is shaped into the objective article using the final shaping die.

According to another preferred embodiment of the present invention, during shaping of the preliminary shaped item, the binder fiber is half melted.

As herein termed, the half melted condition is a condition where the binder fiber does not melt completely, but a portion of the binder fiber such as an outer surface melts while the other portion remains solid.

According to still another preferred embodiment of the present invention, during filling of the preliminary shaped item into the final shaping die, parts such as a backing strip, a front layer pad and an insert wire are filled in together with the preliminary shaped item. This allows to simultaneously shape the parts and the preliminary shaped item during final shaping, thereby the objective article is obtained.

According to the present invention, first, a necessary quantity of the fiber material which is needed for shaping of the objective article is filled into the preliminary shaping die, and the preliminary shaped item is accordingly shaped considering a rational proportion of the fiber material, and therefore, filling shortage does not occur during shaping of the objective article using the final shaping die. As a result, the objective article is shaped with excellent productivity while avoiding a defective shape due to density shortage, filling shortage, etc.

The present invention will be understood better from the following description on the preferred embodiments of the present invention when taken in conjunction with the drawings or the claims.

BRIEF DESCRIPTION OF THE DRAWINGS

FIGS. 1(a) through 1(f) are explanatory diagrams showing a first preferred embodiment;

FIGS. 2(a) through 2(d) are explanatory diagrams of a seat back pad;

FIGS. 10(a) through 10(f) are explanatory diagrams showing a second preferred embodiment;

FIGS. 14(a) through 14(d) are explanatory diagrams showing shaping processes in a conventional laminate-type method;

DESCRIPTION OF THE PREFERRED EMBODIMENTS

Figure 3:
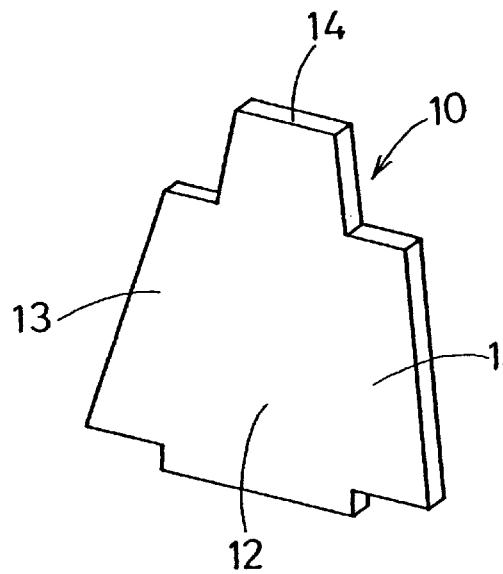
FIGS. 3(a) through 3(d) are explanatory diagrams showing a preliminary shaped item.
Figure 3:
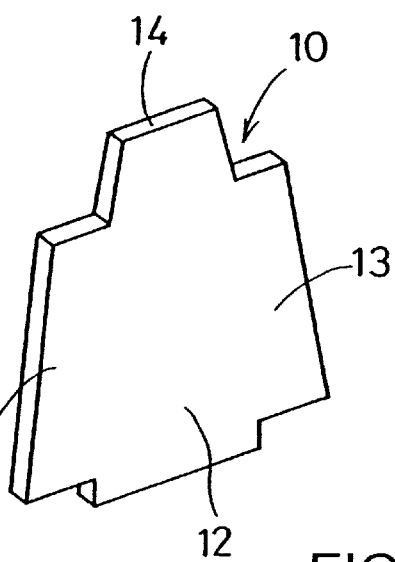
Figure 3:
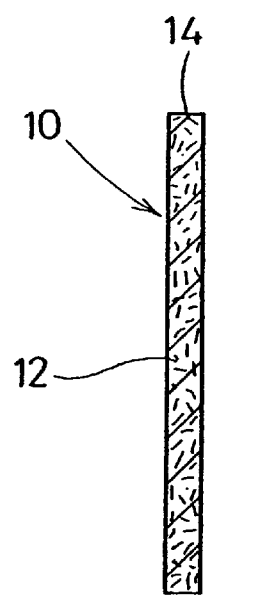
Figure 3:
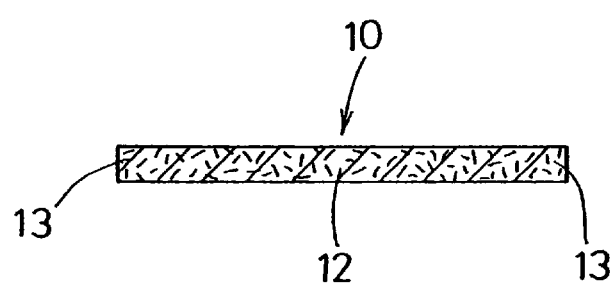
Figure 4:
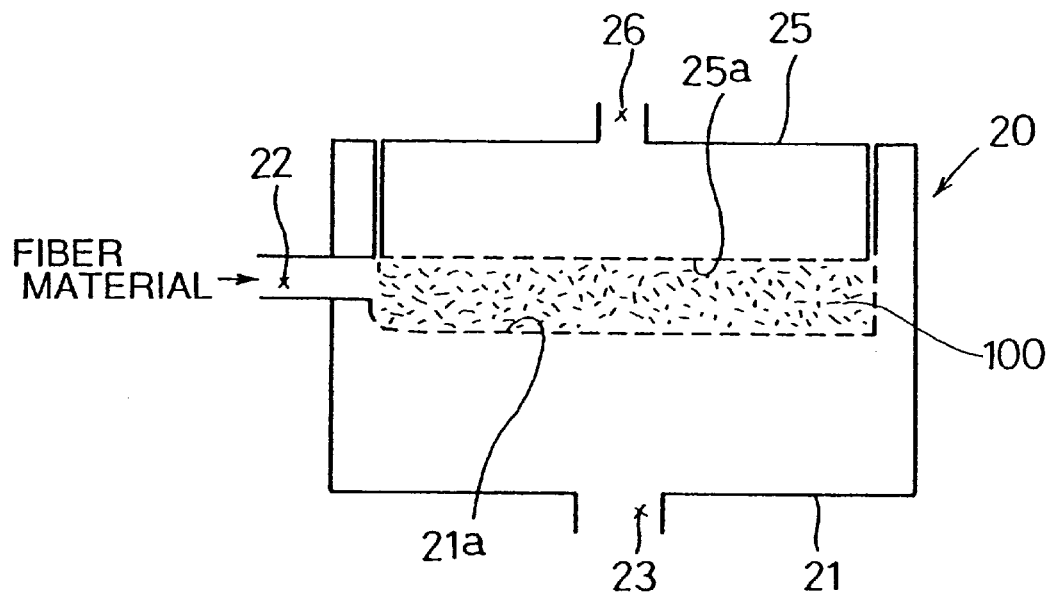
FIGS. 4(a) and 4(b) are explanatory diagrams showing a preliminary shaping die.
Figure 4:
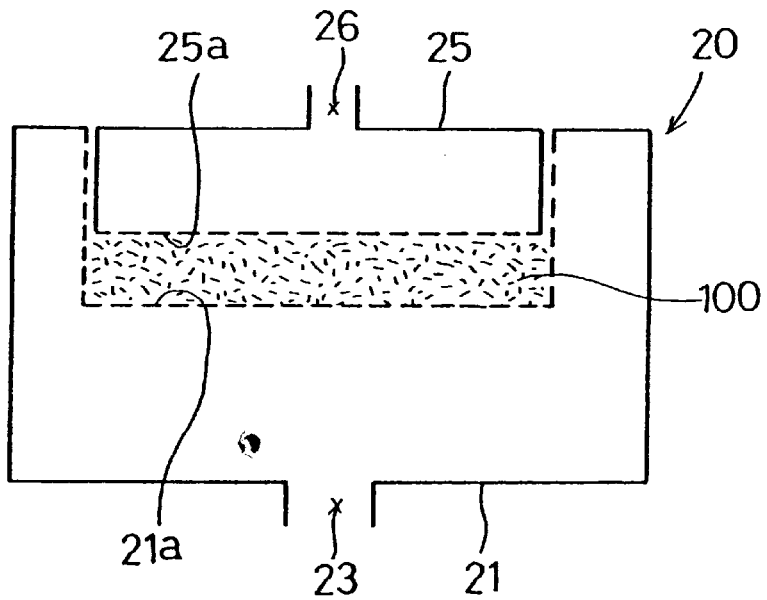
Figure 5:
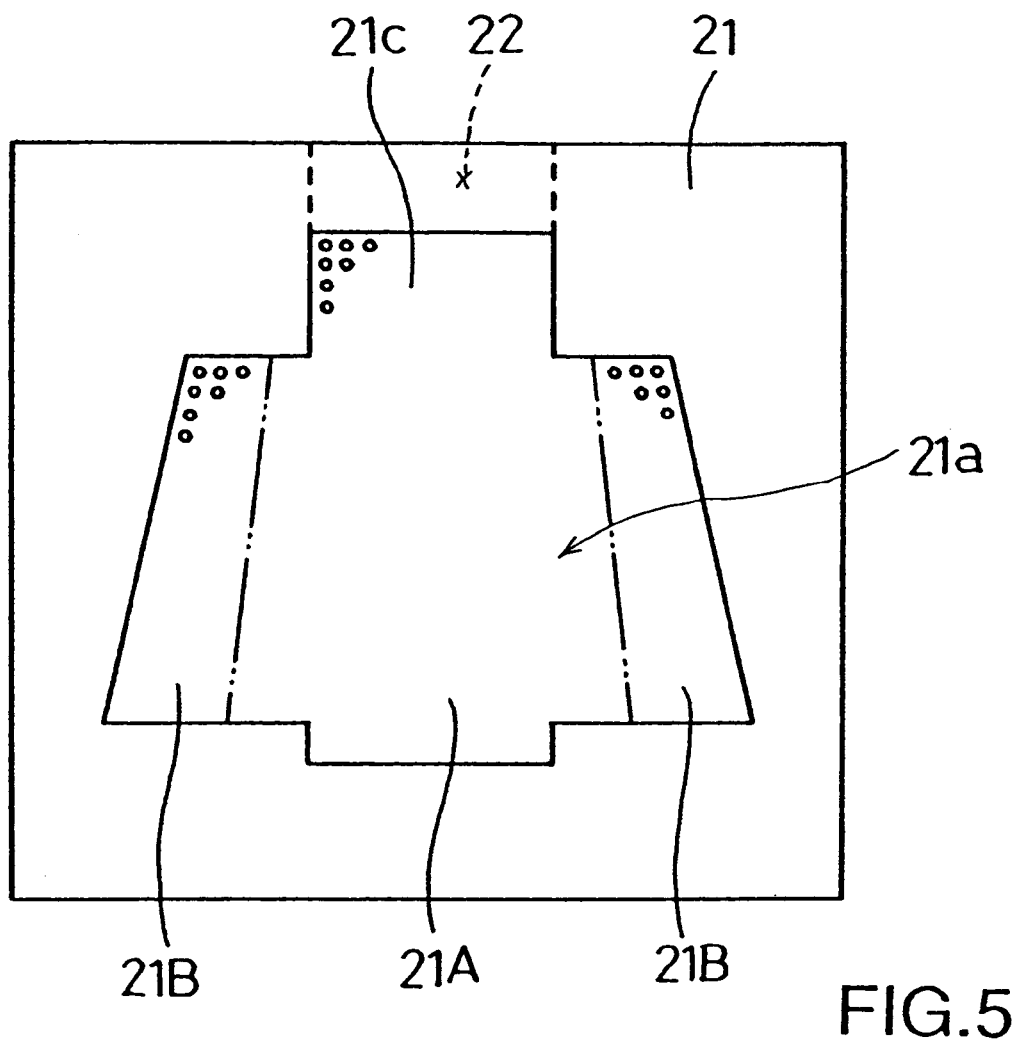
FIG. 5 is a plan view of a bottom die of the preliminary shaping die.
Figure 6:
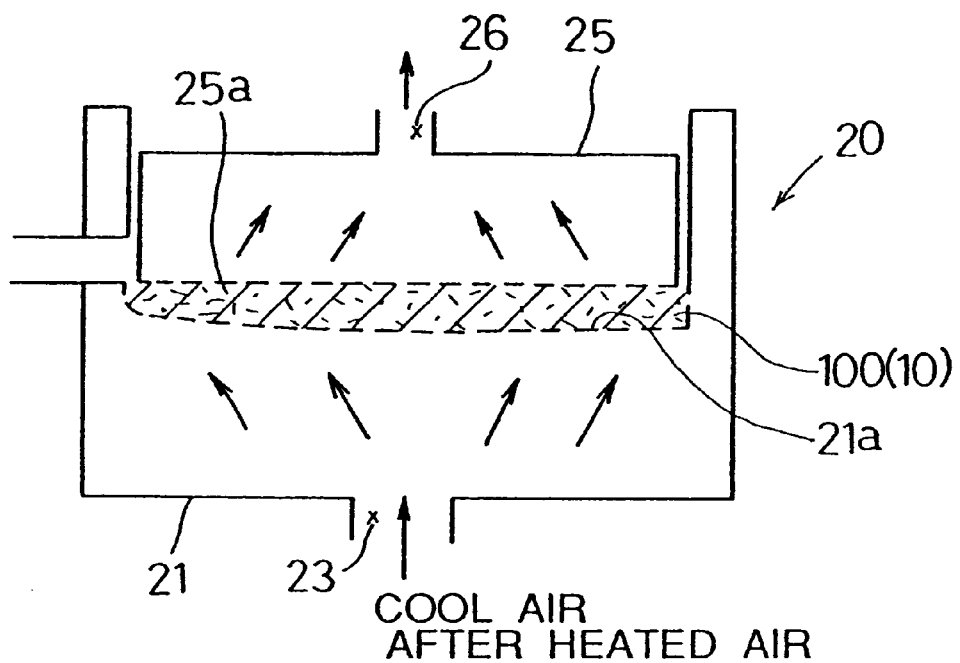
FIGS. 6(a) and 6(b) are explanatory diagrams showing the preliminary shaping die as it is clamped.
Figure 6:
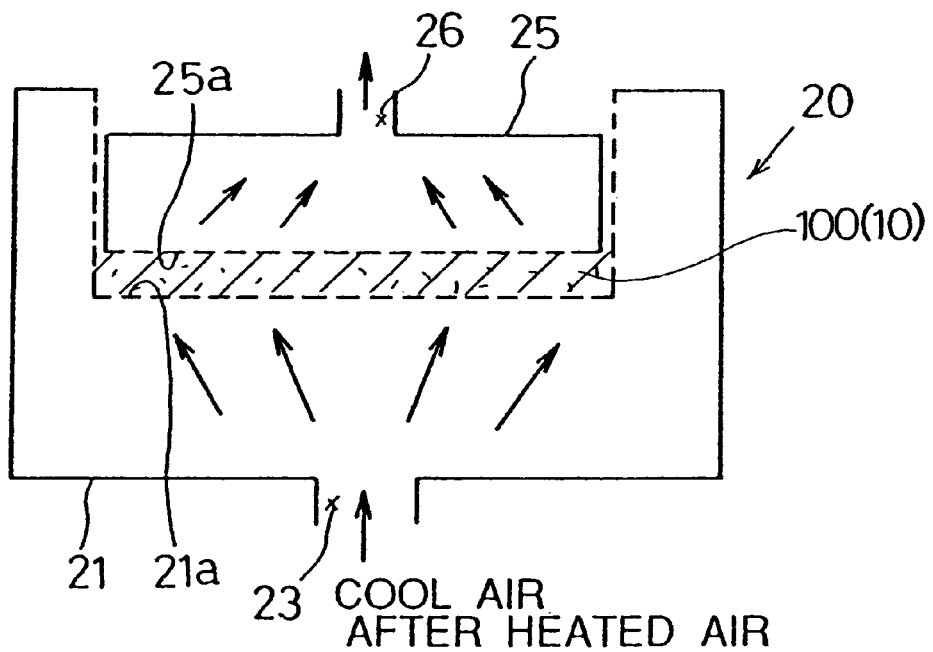
Figure 7:
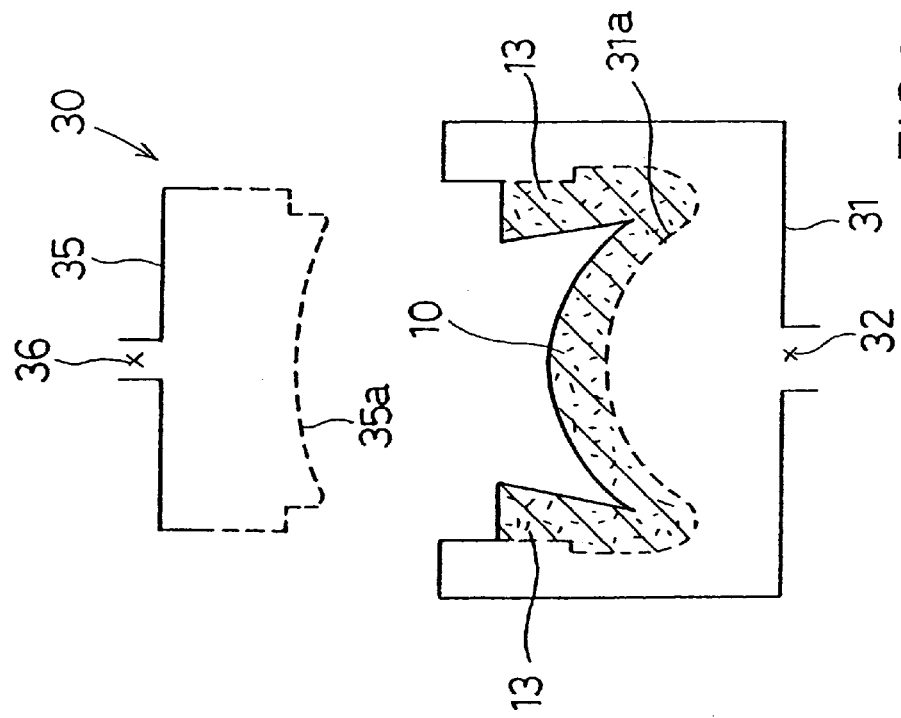
FIGS. 7(a) and 7(b) are explanatory diagrams showing a final shaping die.
Figure 7:
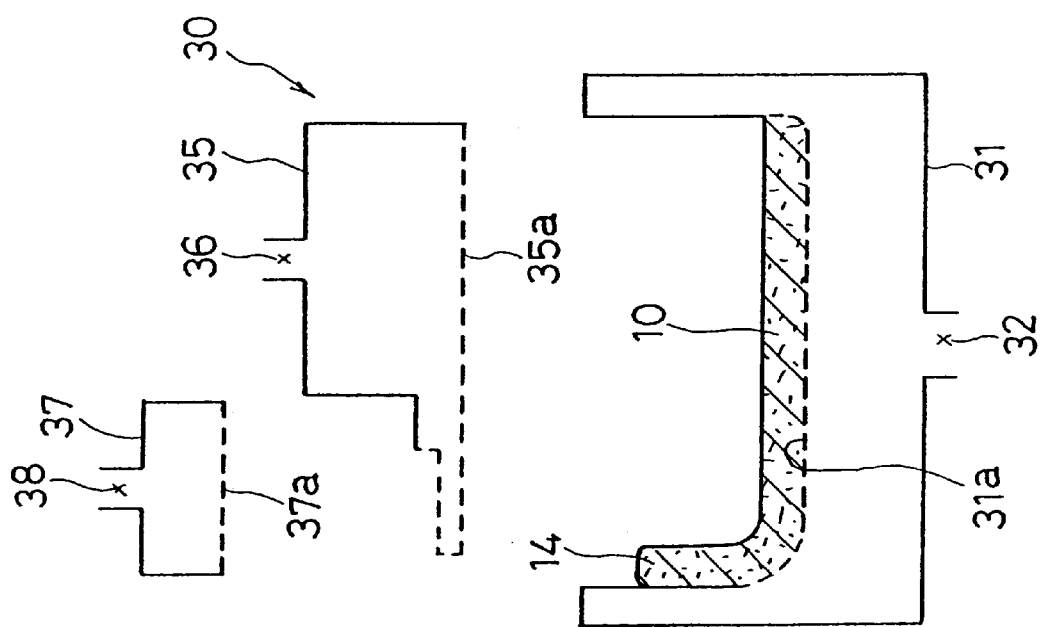
Figure 8:
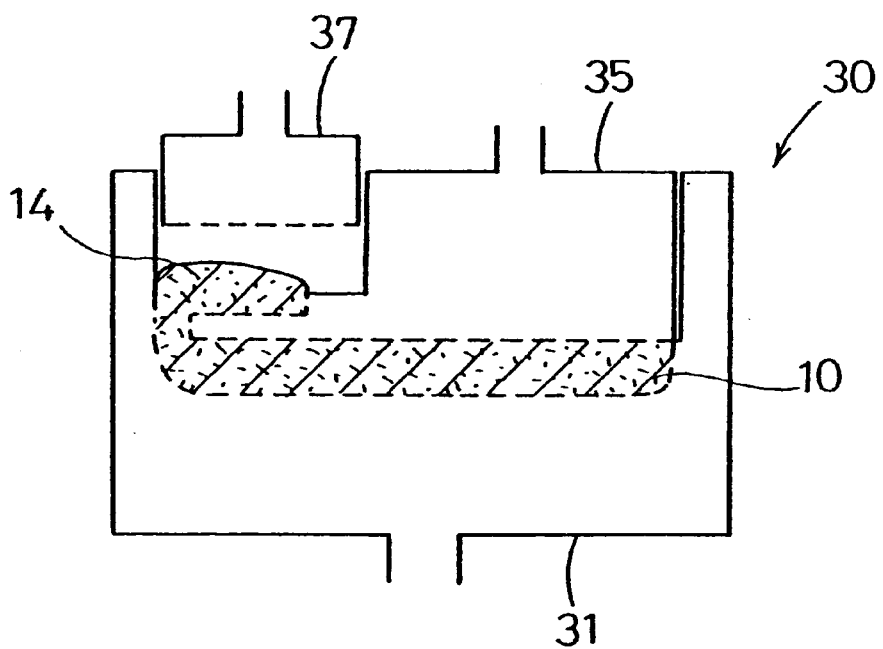
FIGS. 8(a) and 8(b) are explanatory diagrams showing the final shaping die as it is being clamped.
Figure 8:
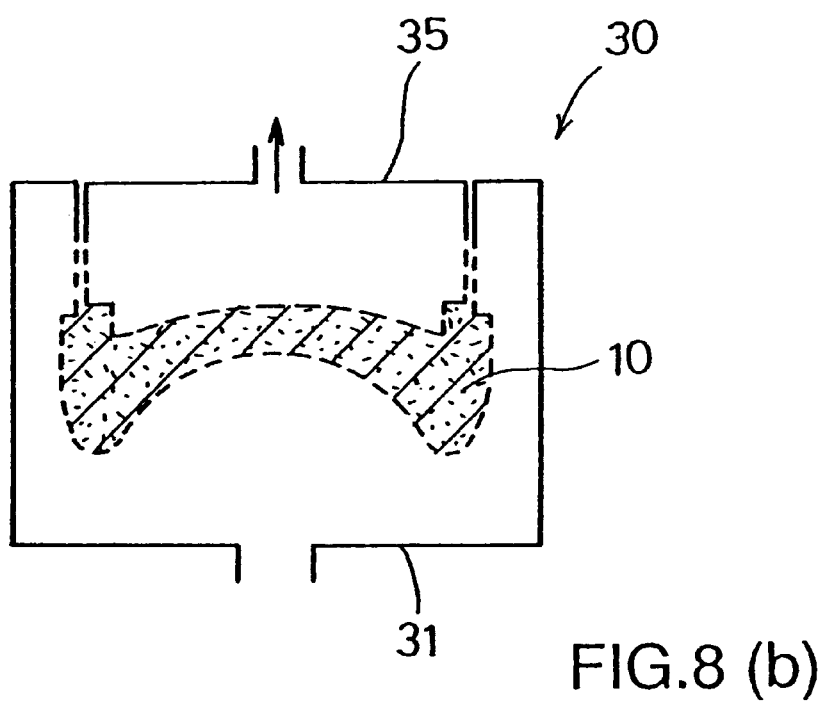
Figure 9:
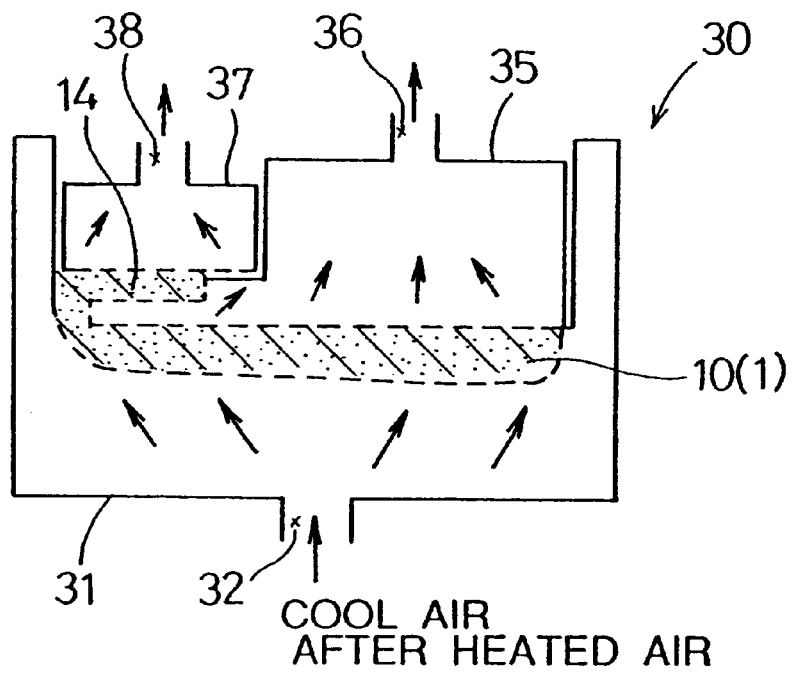
FIGS. 9(a) and 9(b) are explanatory diagrams showing the final shaping die as it is being clamped under heat.
Figure 9:
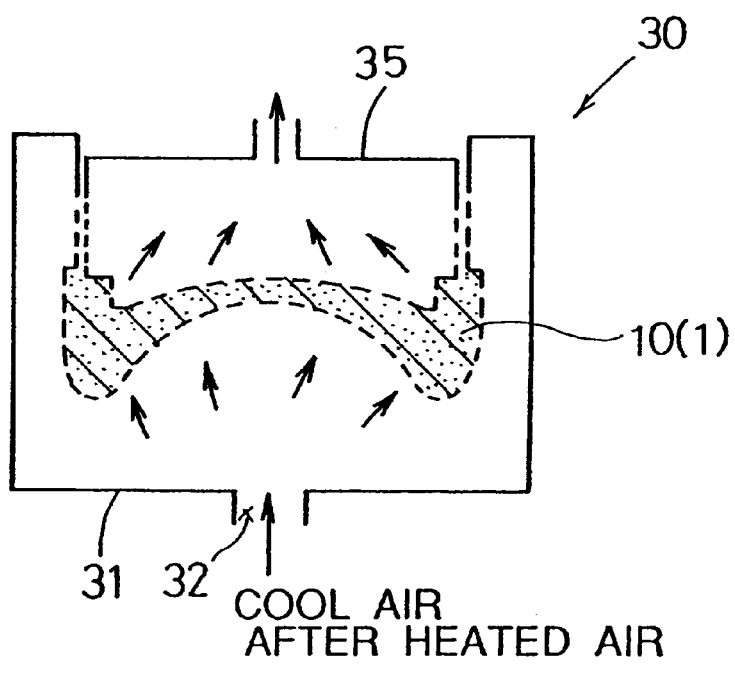

<First Preferred Embodiment of the Present Invention>

A description will be given on a method of and an apparatus for shaping a fibrous elastic body according to a first preferred embodiment of the present invention, with reference to FIG. 1(a) through FIG. 9(b). First, a seat back pad of an automobile which is an objective article to be shaped in the first preferred embodiment will be described with references to the explanatory diagrams in FIG. 2(a) through FIG. 2(d). FIG. 2(a) is a perspective drawing as viewed from the front, FIG. 2(b) is a perspective drawing as viewed from the back, FIG. 2(c) is a side sectional view, and FIG. 2(d) is a plan sectional view. A seat back pad 1 is formed by a fibrous elastic body, for example, a polyester fibrous elastic body, and comprises on the surface thereof a general portion 2 which forms a backrest surface 2a, vertical wall portions 3 (or "side portions") which are formed on the left-hand side and the right-hand side of the general portion 2, and a pocketform back lining top portion (or "a pocketform portion") 4 which is formed above the general portion 2. Each vertical wall portion 3 includes a side support portion 3a and an edge portion 3b.

A technique of shaping the seat back pad 1, as a preprocessing step prior to a final shaping process of shaping the seat back pad 1, includes a preliminary shaping process of shaping a preliminary shaped item 10 which is shown in FIG. 3(a) through FIG. 3(d). FIG. 3(a) is a perspective drawing as viewed from the front, FIG. 3(b) is a perspective drawing as viewed from the back, FIG. 3(c) is a side sectional view, and FIG. 3(d) is a plan sectional view. The preliminary shaped item 10 has a general shape which is simplified based on a developed shape of the seat back pad 1 which is shown in FIG. 2(a). That is, the preliminary shaped item 10 comprises a main portion 12 which will become the general portion 2 of the seat back pad 1 which is shown in FIG. 2(a), developed side portions 13 of the left-hand side and the right-hand side which correspond to the vertical wall portions 3 as they are developed to the left-hand side and the right-hand side of the main portion 12, and a developed top portion 14 which corresponds to the back lining top portion 4 as it is developed above the main portion 12, and has an approximately flat-panel shape which is thicker than the general portion 2. The respective developed side portions 13 are formed to have a developed length which is approximately double those of the corresponding vertical wall portions 3, respectively, in the left-hand direction and the right-hand direction.

First, the preliminary shaping process of shaping the preliminary shaped item 10 will be described. As in the conventional blow-type technique described earlier, the fibrillated fiber material 100 is a fiber material which is to be used at this process. The fibrillated fiber material 100 is a fiber material of a heat fusion type which uses a matrix fiber, which is formed by a polyester fiber of 1.8 to 27 dtex(2 to 30 denier) and serves as a main frame, and a binder fiber, which is formed by a polyester fiber of 1.8 to 9 dtex(2 to 10 denier) which has a low melting point and bonds the matrix fiber, at a mixing ratio of 10 to 50%, for example. As the matrix fiber, a crimped fiber is used so that the matrix fiber has an elasticity. As the fibrillated fiber material 100, ELK (brand name) which is available from Teijin Ltd., for example, may be used.

Now, a preliminary shaping die 20 which is used for preliminary shaping will be described with reference to the front sectional view in FIG. 4(a) and the side sectional view in FIG. 4(b). The preliminary shaping die 20 which is illustrated as it is opened in FIGS. 4(a) and 4(b) comprises a bottom die 21 and a top die 25 which are approximately box-like shaped. The bottom die 21 and the top die 25 have shaping surfaces 21a and 25a, respectively, which define a cavity of the preliminary shaped item 10 when the shaping die is closed. The respective shaping surfaces 21a and 25a of the bottom die 21 and the top die 25 are formed by a highly breathable punching metal which includes a number of holes at a proportion of approximately 2 to 40%, for instance. The shaping surface 21a of the bottom die 21 forms a front surface portion of the preliminary shaped item 10. The shaping surface 25a of the top die 25 forms a back surface portion of the preliminary shaped item 10. A material blowing slot 22 is formed at one side of the surface of the bottom die 21, and an air supply slot 23 is formed at the bottom surface of the bottom die 21. On the other hand, an exhaust slot 26 is formed at the top surface of the top die 25. Further, in FIG. 5 which shows the plan view of the bottom die 21, the shaping surface 21a of the bottom die 21 includes a main portion forming portion 21A which forms the main portion 12 of the preliminary shaped item 10, side portion forming portions 21B which form the developed side portions 13 of the left-hand side and the right-hand side, and a top portion forming portion 21C which forms the developed top portion 14.

In order to shape the preliminary shaped item 10 using the preliminary shaping die 20 described above, in FIGS. 4(a) and 4(b), an inner space which is created between the bottom die 21 and the top die 25 as they are opened is filled with the fibrillated fiber material 100 by air feeding under a pressure feed force, that is, air blown, through the material blowing slot 22 of the bottom die 21. At this stage, since the preliminary shaped item 10 has a simple shape which is close to a rectangular parallelepiped, filling is performed at a constant density distribution while avoiding density shortage or filling shortage which is otherwise caused during filling of the fibrillated fiber material 100 into the preliminary shaping die 20. A density (bulkiness density) at which the fibrillated fiber material 100 is filled into the preliminary shaping die 20 is preferably about 0.005 to 0.02 g/cm$^3$, for example. Further, instead of air feeding under a pressure feed force described above, filling may be realized by means of air feeding with a suction force which sucks in the air within the cavity, that is, suction of air utilizing the air supply slot 23 of the bottom die 21 and the exhaust slot 26 of the top die 25.

Next, as shown in the front sectional view in FIG. 6(a) and the side sectional view in FIG. 6(b), the top die 25 is closed over the bottom die 21 to clamp the fiber material 100. Clamping of the top die 25 is continued until the density of the fiber material 100 becomes about 0.02 g/cm$^3$, for example. Following this, in the clamping condition described immediately above, heated air is fed inside the bottom die 21 under pressure through the air supply slot 23 of the bottom die 21. After being blown through the fiber material 100, the heated air is discharged outside at the exhaust slot 26 through the top die 25. The heated air is set to a mild temperature which half melts the binder fiber of the fiber material 100, e.g., 180° C. which is 15 to 20° C. lower than the melting temperature of 200° C., for example, of the melting temperature of the binder fiber. Heated by the heated air, the binder fiber which is contained in the fiber material 100 half melts, whereby the matrix fiber is preliminarily shaped in the shape of the preliminary shaped item. As herein termed, half melting refers to a condition where a portion of the binder fiber, such as an outer surface, melts but the binder fiber otherwise remains solid instead of completely melting.

Instead of the heated air, vapor may be used as a heat medium.

Next, instead of the heated air, cool air is blown through the fiber material 100 which now has the shape of the preliminary shaped item, to thereby cool the fiber material 100 to about 100° C., for example. This solidifies the half melting binder fiber. Following this, the shaping die is opened and the content is detached from the shaping die, whereby the preliminary shaped item 10 as that shown in FIGS. 3(a) through 3(d) is obtained. During die opening, as shown in FIGS. 6(a) and 6(b), by means of a suction air force which is provided through the exhaust slot 26 of the top die 25, the preliminary shaped item 10 is sucked to the shaping surface 25a of the top die 25 and the shaping die is opened. Both the top die 25 and the preliminary shaped item 10 are conveyed to the next step which is the final shaping step, which realizes easy handling of the preliminary shaped item 10.

Now, the final shaping step will be described. With reference to the front sectional view in FIG. 7(a) and the side sectional view in FIG. 7(b), a final shaping die 30 which is used for final shaping will be described. The final shaping die 30, which is shown as it is opened in both FIG. 7(a) and FIG. 7(b), comprises a bottom die 31, a first top die 35 and a second top die 37 which are approximately box-like shaped. The bottom die 31, the first top die 35 and the second top die 37 include a shaping surface 31a, a shaping surface 35a and a shaping surface 37a, respectively, which form the cavity of the seat back pad 1 which is to be shaped with the die closed. The shaping surface 31a, the shaping surface 35a and the shaping surface 37a, respectively, of the bottom die 31, the first top die 35 and the second top die 37, like the shaping surfaces of the preliminary shaping die 20 described earlier, are formed by a highly breathable punching metal which includes a number of holes. The shaping surface 31a of the bottom die 31 forms a front surface portion of the seat back pad 1. The shaping surface 35a of the first top die 35 forms a back surface portion of the seat back pad 1. The shaping surface 37a of the second top die 37 forms a front surface portion of the back lining top portion 4 of the seat back pad 1. The bottom die 31 includes an air supply slot 32 in the bottom surface thereof. Meanwhile, an exhaust slot 36 and an exhaust slot 38 are formed in the top surfaces of the first top die 35 and the second top die 37, respectively.

In order to shape the seat back pad 1 using the final shaping die 30, in FIGS. 7(a) and 7(b), the preliminary shaped item 10 which is shaped at the preliminary shaping step (See FIGS. 3(a) through 3(d)) is filled into the shaping surface 31a of the bottom die 31 which is opened. Filling of the preliminary shaped item 10 may be performed by an operator, a robot hand, etc. At this stage, the developed top portion 14 of the preliminary shaped item 10, as shown in FIG. 7(a), is bent approximately in the shape of the letter L within the shaping surface 31a of the bottom die 31. Meanwhile, the developed side portions 13 of the left-hand side and the right-hand side of the preliminary shaped item 10, as shown in FIG. 7(b), are bent back within the shaping surface 31a of the bottom die 31 and then filled.

Next, as shown in the front sectional view in FIG. 8(a) and the side sectional view in FIG. 8(b), the first top die 35 is closed over the bottom die 31 to clamp the preliminary shaped item 10. Clamping of the first top die 35 is continued until the density of the fiber material 100 becomes about 0.02 to 0.03 g/cm$^3$, for example. The developed top portion 14 of the preliminary shaped item 10 is bent back over the corresponding portion of the first top die 35.

Next, as shown in the front sectional view in FIG. 9(a) and the side sectional view in FIG. 9(b), the second top die 37 is closed over the bottom die 31 to clamp the developed top portion 14 of the preliminary shaped item 10 in the first top die 35, while at the same time clamping the developed top portion 14 one stage further by the first top die 35. Clamping with the first top die 35 is continued until the density of the fiber material 100 becomes about 0.03 to 0.05 g/cm$^3$, for example. Clamping with the second top die 37 is continued until the density of the fiber material 100 becomes about 0.03 to 0.05 g/cm$^3$, for example.

Following this, in the clamping condition described immediately above, heated air is fed inside the bottom die 31 under pressure through the air supply slot 32 of the bottom die 31. After being blown through the preliminary shaped item 10, the heated air is discharged outside through the first top die 35 and the second top die 37 at the exhaust slots 36 and 38. The heated air is at such a strong temperature that it sufficiently melts the binder fiber of the preliminary shaped item 10 but does not damage the matrix fiber, for instance, a temperature which is somewhat higher, e.g., higher by 20 to 30° C. than the melting point of the binder fiber. For example, if the melting point of the binder fiber of polyester is 175° C., the temperature of the heated air is approximately 200° C. Heated by the heated air, the binder fiber which is contained in the preliminary shaped item 10 melts and soaks within the preliminary shaped item 10. Instead of heated air, vapor may be used as a heat medium.

Next, instead of heated air, cool air is blown through the preliminary shaped item 10 which now has the shape of the seat back pad, to thereby cool the preliminary shaped item 10 to about 80° C., for example. This solidifies the melted binder fiber. As a result, the seat back shape is fixed and a final product is obtained. After this, the shaping die is opened and the content is detached from the shaping die, whereby the seat back pad 1 as that shown in FIG. 2(*a*) is obtained.

Schematic views showing the shaping steps described above are shown in FIGS. 1(*a*) through 1(*f*). More specifically, FIGS. 1(*a*) through 1(*c*) show the preliminary shaping step, among which FIG. 1(*a*) shows the step of filling the fiber material 100, FIG. 1(*b*) shows the step of heat-clamping and cooling of the fiber material 100, and FIG. 1(*c*) shows the preliminary shaped item 10 as it is after being detached from the shaping die. On the other hand, FIGS. 1(*d*) through 1(*f*) show the final shaping step, among which FIG. 1(*d*) shows the step of filling the preliminary shaped item 10, FIG. 1(*e*) shows the step of heat-clamping and cooling of the preliminary shaped item 10, and FIG. 1(*f*) shows the seat back pad 1 as it is after being detached from the shaping die.

According to the technique of shaping the seat back pad 1 which is formed by a fibrous elastic body described above, it is possible to fill the fibrillated fiber material 100 into the preliminary shaping die 20, with a rational material proportion and in a condition which easily allows filling a necessary quantity of the fibrillated fiber material 100 needed for the shaping of the seat back pad 1 which is an objective article to be shaped, and to preliminarily shape the fibrillated fiber material 100. This easily permits filling of the preliminary shaped item 10 into the final shaping die 30 without any filling shortage and finally shape. Hence, it is possible to shape the seat back pad 1 with excellent productivity while avoiding a defective shape due to density shortage, filling shortage, etc.

Figure 16:
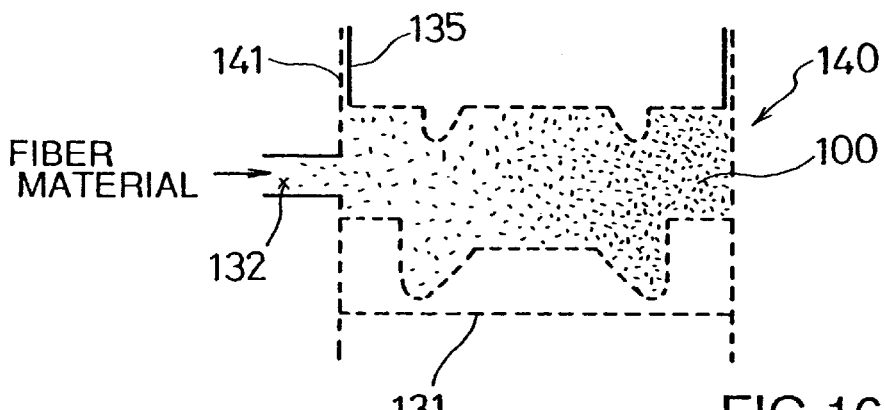
FIG. 16 is an explanatory diagram showing a filling process in a conventional blow-type method.
Figure 17:
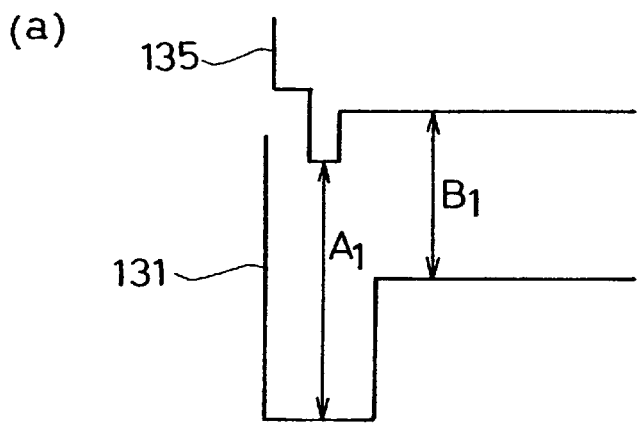
FIGS. 17(a) and 17(b) are explanatory diagrams for describing density shortage.
Figure 17:
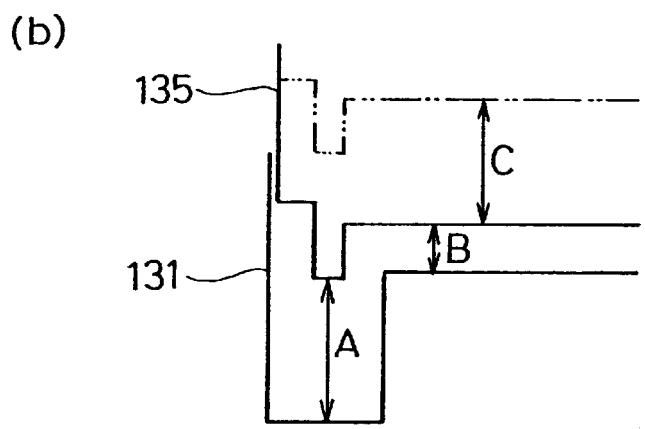
Figure 18:
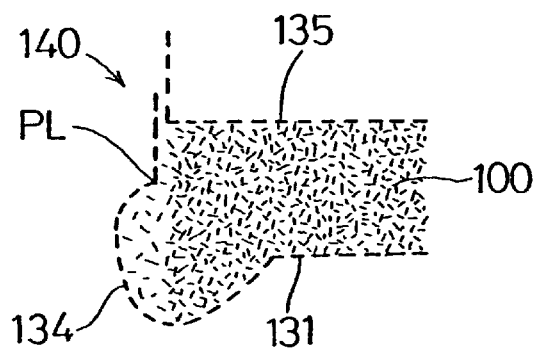
FIGS. 18(a) through 18(c) are explanatory diagrams for describing filling shortage.
Figure 18:
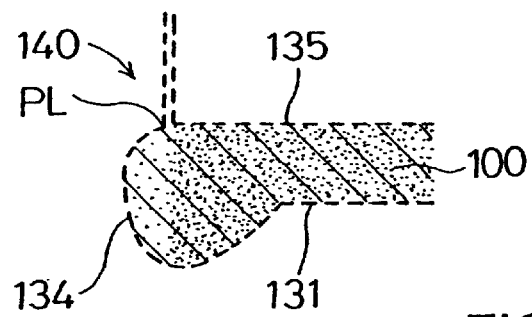
Figure 18:
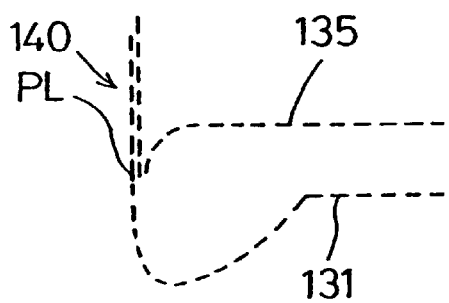
Figure 19:
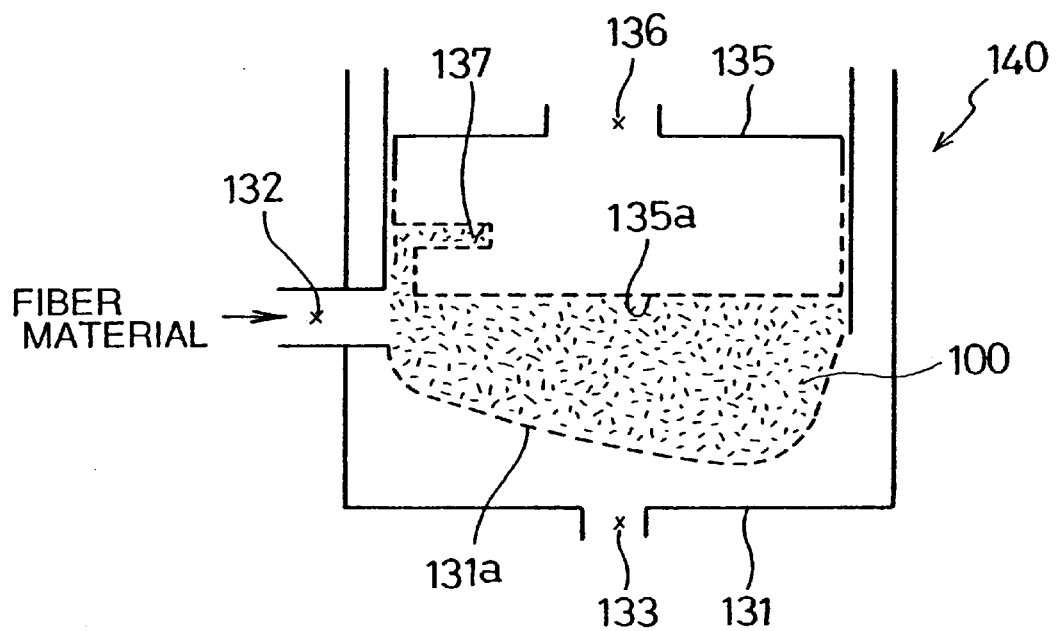
FIGS. 19(a) and 19(b) are explanatory diagrams for describing another example of filling shortage.
Figure 19:
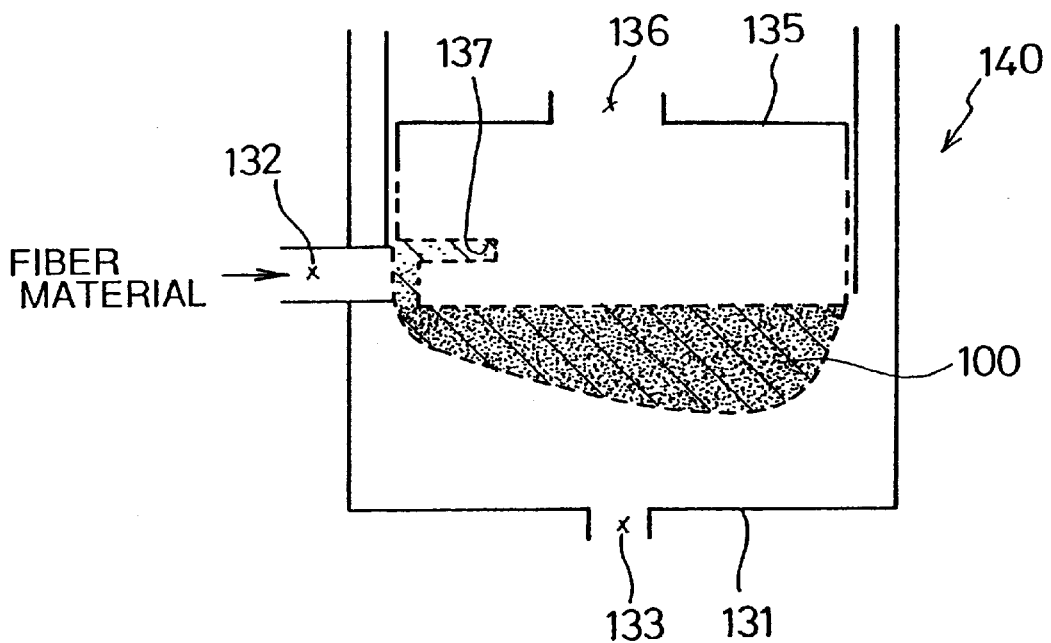

Describing in detail, the shaping technique, according to the first preferred embodiment, does not require to cut the fiber material or set the fibrous mat material to the bottom die which has been heretofore needed in the conventional laminate shaping technique, and therefore, it is possible to improve the problem of productivity. Further, it is possible to avoid a defective shape due to a drop in the density which is caused by a difference in the clamping volume for clamping the fibrillated fiber material and a defective shape due to an insufficient density in the pocketform portion 4. For example, while 0.030 g/cm$^3$ is a limit density of the vertical wall portions 3 when the density of the general portion 2 is 0.040 g/cm$^3$ according to the conventional technique (See FIGS. 16 through 17(*b*)), according to the first preferred embodiment, it is possible to form the vertical wall portions 3 which have a density of 0.02 to 0.08 g/cm$^3$, and accordingly, to avoid a defective shape due to a drop in the density. In addition, since a restriction in terms of the structure of the shaping die (See FIGS. 8(*a*) through 8(*c*)), such as the parting line PL, which has been heretofore a problem is lifted, even if the bottom die 31 is in an undercut state with respect to the parting line PL, a defective shape due to a drop in the density or other cause is avoided, and therefore, it is possible to set the parting line PL freely in any portion. Further, it is possible to solve the problem of filling shortage of the fiber material (See FIGS. 19(*a*) and 19(*b*)) as compared with the recess portion of the shaping die which corresponds to the pocketform portion 4 of the seat back pad 1, and to avoid a defective shape due to an insufficient density of the pocketform portion 4.

In addition, since the fiber material is the fibrillated fiber material 100, it is possible to fill the fibrillated fiber material 100 easily into the preliminary shaping die 20 by air feeding with a suction force or a pressure feed force. This realizes a production efficiency, which is a problem to be solved in the conventional laminate shaping technique, as high as that in the blow shaping technique. For example, if a process expense rate is 1 in the laminate shaping technique, a process expense rate in the blow shaping technique is 0.5, whereas a process expense rate is 0.6 according to the first preferred embodiment. Further, instead of the fibrillated fiber material 100, a matted fiber material which has a low bulkiness density may be used.

Further, as the binder fiber is half melted and preliminarily shaped during the preliminary shaping, it is possible to enhance the shape retainability of the preliminary shaped item 10, and hence, to prevent the preliminary shaped item 10 from losing its shape while transported. Where pressure clamping alone does not cause the preliminary shaped item 10 to lose its shape, half melting of the preliminary shaped item 10 may be omitted. As herein termed, preliminary shaping refers to slight shaping, i.e., handling to such an extent which does not cause shape loss.

Further, since the preliminary shaped item 10 has a simple shape which is simplified based on the developed shape of the seat back pad 1, it is possible to simplify the shape of the preliminary shaped item 10 into an approximately flat plate-like shape.

Further, as the preliminary shaped item 10 as it is partially folded is filled into the final shaping die 30 so that the preliminary shaped item 10 is made partially dense, it is possible to easily create a high-density portion of the seat back pad 1 during final shaping.

Figure 20:
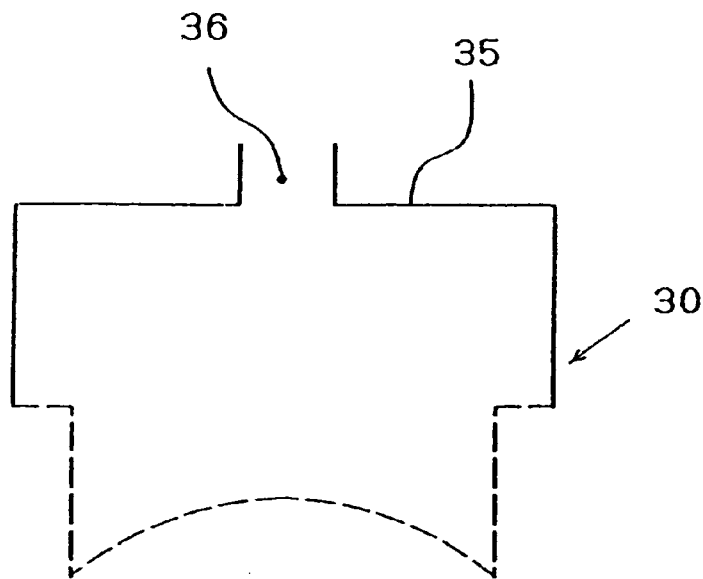
FIGS. 20(a) and 20(b) are explanatory diagrams showing a condition in which the preliminary shaped item and parts are filled into the final shaping die.
Figure 20:
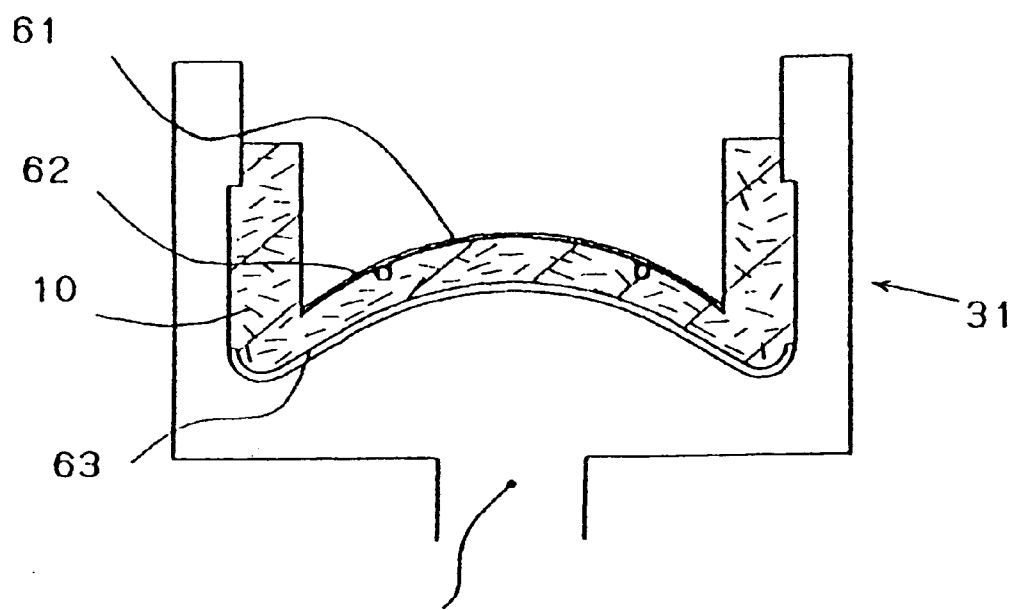

Further, it is possible to fill parts, such as a non-woven fabric and a pendant wire, which are to be attached to the back surface of the seat back pad 1 into the final shaping die 30 together with the preliminary shaped item 10 and to simultaneously shape them altogether, as in the conventional laminate-type technique. Now, a method of such shaping will be described with reference to FIGS. 20(*a*) and 20(*b*). FIGS. 20(*a*) and 20(*b*) are explanatory diagrams showing an example of a condition of filling for simultaneous shaping of parts, among which FIG. 20(*a*) is a side sectional view of the top die 35 of the final shaping die 30 as it is opened, and FIG. 20(*b*) is a similar side sectional view of the bottom die 31. First, after setting a preplaced pad 63, which will become a front layer of the pad material, within the bottom die 31, the preliminary shaped item 10 is set on the preplaced pad 63. Following this, a pendant wire 62 is set to a predetermined position of the back surface of the preliminary shaped item 10. Further, if necessary, a non-woven fabric 61 which is to be attached to the back surface of the preliminary shaped item 10 is set. The shaping die is thereafter closed and final shaping is executed, whereby the parts are shaped at once. The non-woven fabric 61 corresponds to what is referred to as the backing strip in the present invention, the pendant wire 62 corresponds to what is referred to as the insert wire in the present invention, and the preplaced pad 63 corresponds to what is referred to as the front layer pad in the present invention.

As described above, as the parts such as the non-woven fabric 61 and the pendant wire 62 are simultaneously shaped and integrated with each other into one unit, the adhesive power of the binder fiber which is contained in the fiber material integrates the parts with the seat back pad 1 accurately and efficiently.

Further, where simultaneous shaping of the parts as described above fails to provide a sufficient adhesion strength between the seat back pad 1 and the parts, when the preliminary shaped item 10 is set in the bottom die 31, a thin layer web which contains components such as the binder fiber is inserted between the preliminary shaped item 10 and the parts. As final shaping is executed in this condition, the web melts and adheres thereby exhibiting its adhesive power, and therefore, the adhesion strength between the preliminary shaped item 10 and the parts is largely increased. The thin layer web corresponds to the bonding means in the present invention. Alternatively, instead of the thin layer web, the bonding means may be an adhesive agent of the hot-melt type which is to be applied between the preliminary shaped item 10 and the parts, or an ordinary liquid or a jelly-like adhesive agent which is to be inserted between the preliminary shaped item 10 and the parts, thereby creating a similar effect to the above.

Figure 21:
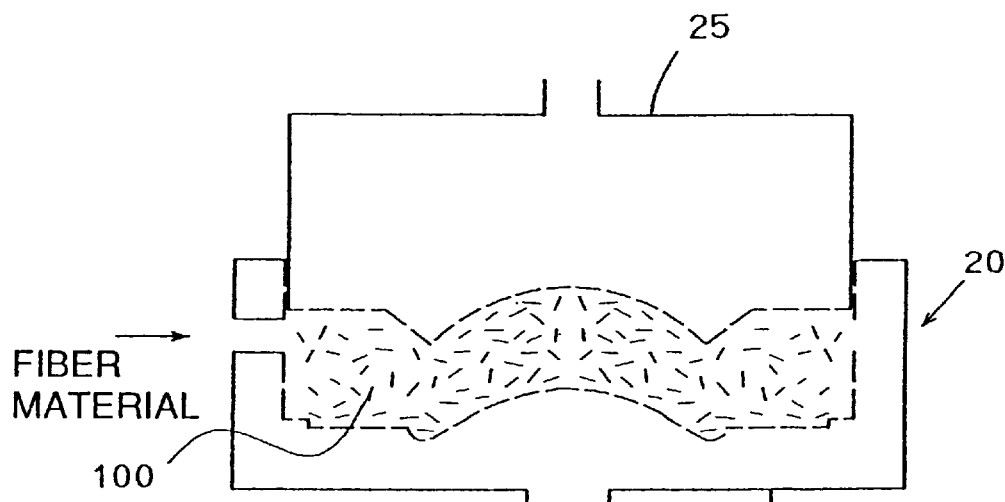
FIGS. 21(a) through 21(c) are explanatory diagrams showing another example of the preliminary shaping process.
Figure 21:
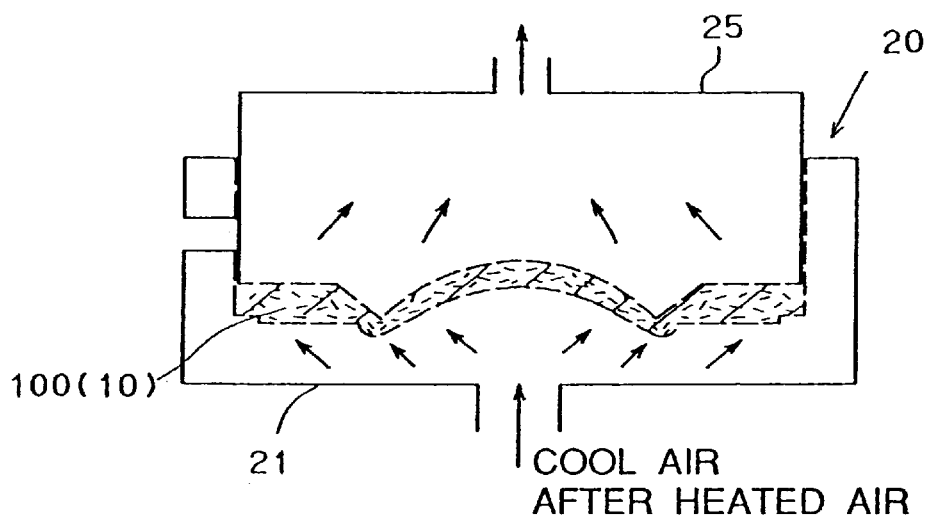
Figure 21:
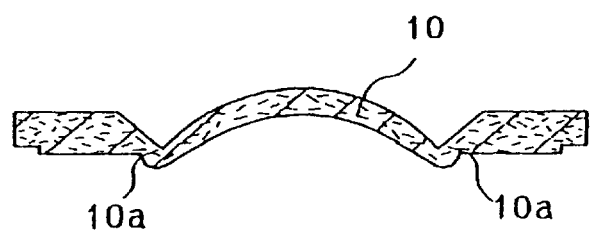

Further, it is possible to shape approximately to the final objective shape except for a local shape during preliminary shaping and to shape the local shape of the preliminary shaped item 10 which is preliminarily shaped locally into the final objective shape during final shaping. Now, such a shaping technique will be described with reference to FIGS. 21(*a*) through 21(*c*). FIGS. 21(*a*) through 21(*c*) are explanatory diagrams showing another example of a condition of filling for simultaneous shaping of parts, among which FIG. 21(*a*) is a side sectional view of the preliminary shaping die as it is opened, FIG. 21(*b*) is a side sectional view of the preliminary shaping die as it is closed, and FIG. 21(*c*) is a cross sectional view of the preliminary shaped item 10. As shown in FIG. 21(*a*), the top die 25 and the bottom die 21 of the preliminary shaping die 20 are used to create a cavity which is similar to the final objective shape, the fiber material 100 is filled by blowing into the inner space between the top die 25 and the bottom die 21. Next, as shown in FIG. 21(*b*), the top die 25 is moved downward after the fiber material 100 is filled, and the fiber material 100 is clamped. In this condition, heated air is blown through the preliminary shaped item 10 to thereby melt the binder fiber of the fiber material 100. Following this, after cooling and accordingly solidifying the binder fiber, the shaping die is opened and the content is detached from the shaping die, thereby obtaining the preliminary shaped item 10 as that shown in FIG. 21(*c*). As a result, the complex design surface and the back surface of the seat back pad 1 are shaped during preliminary shaping. Since it is necessary during final shaping to bend the left-hand side and the right-hand side frame portions of the preliminary shaped item 10 (i.e., the left-hand side and the right-hand side end portions of FIG. 21(*c*)), bent portions 10*a* are shaped larger than the final objective shape, leaving widths for compression. During final shaping, the frame portions of the preliminary shaped item 10 are shaped partially into the final objective shape.

As described above, as shaping approximately into the final objective shape is completed except for local shapes during preliminary shaping and the local shapes of the preliminary shaped item 10 which are preliminarily shaped are shaped partially into the final objective shape during final shaping, it is possible to set the preliminary shaped item 10 into the final shaping die easily and accurately during final shaping. Further, it is possible to suppress shaping using the final shaping die to a partial range. Hence, it is not necessary to heat up the entire final shaping die.

<Second Preferred Embodiment of the Present Invention>

Figure 11:
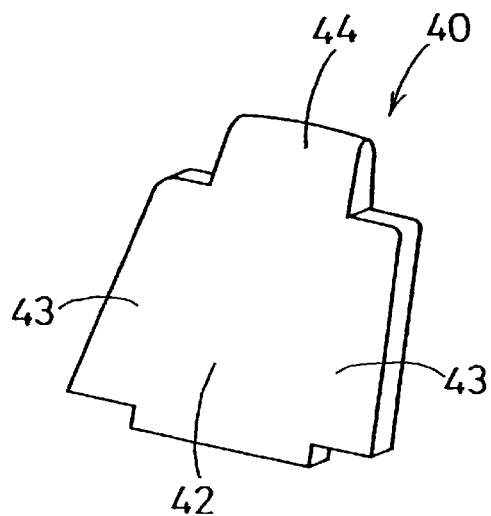
FIGS. 11(a) through 11(d) are explanatory diagrams showing a preliminary shaped item.
Figure 11:
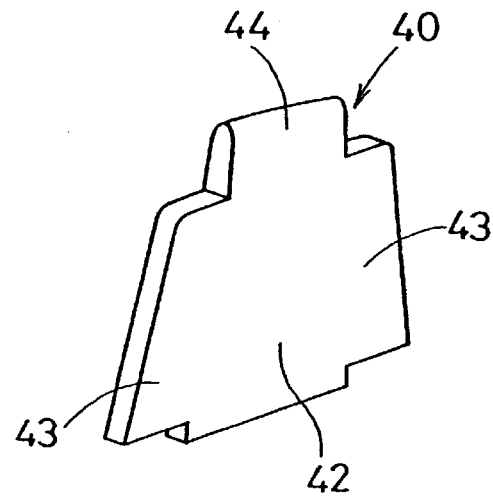
Figure 11:
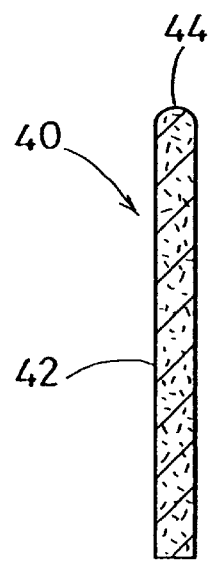
Figure 11:
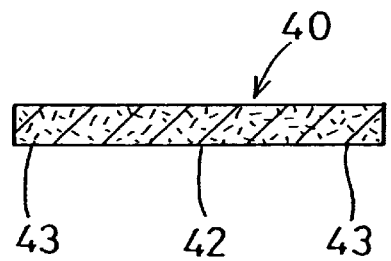
Figure 12:
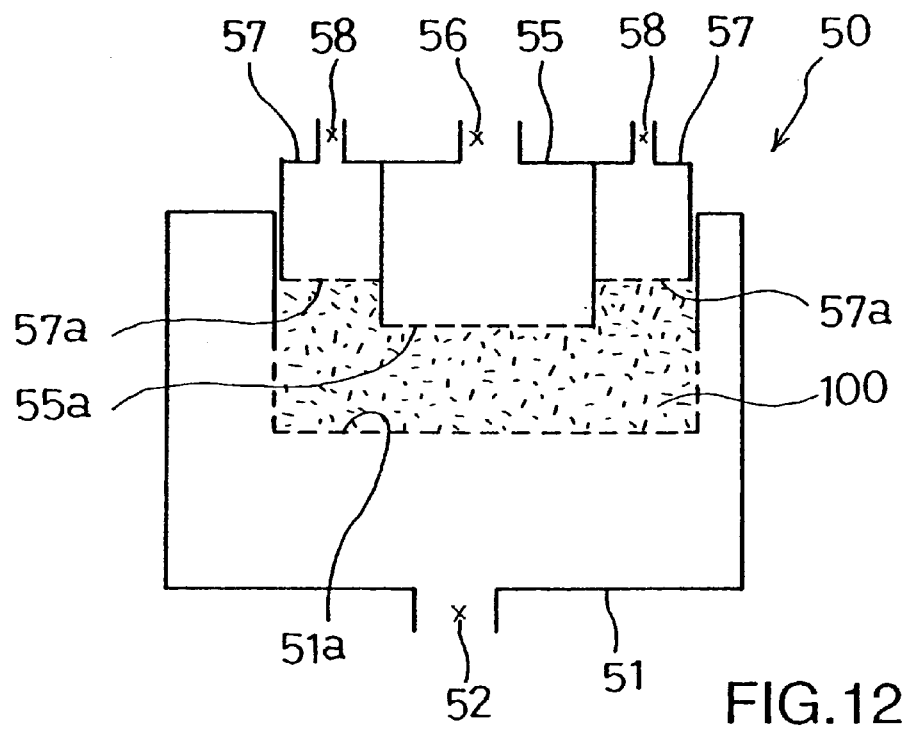
FIGS. 12(a) through 12(b) are explanatory diagrams showing a preliminary shaping process.
Figure 12:
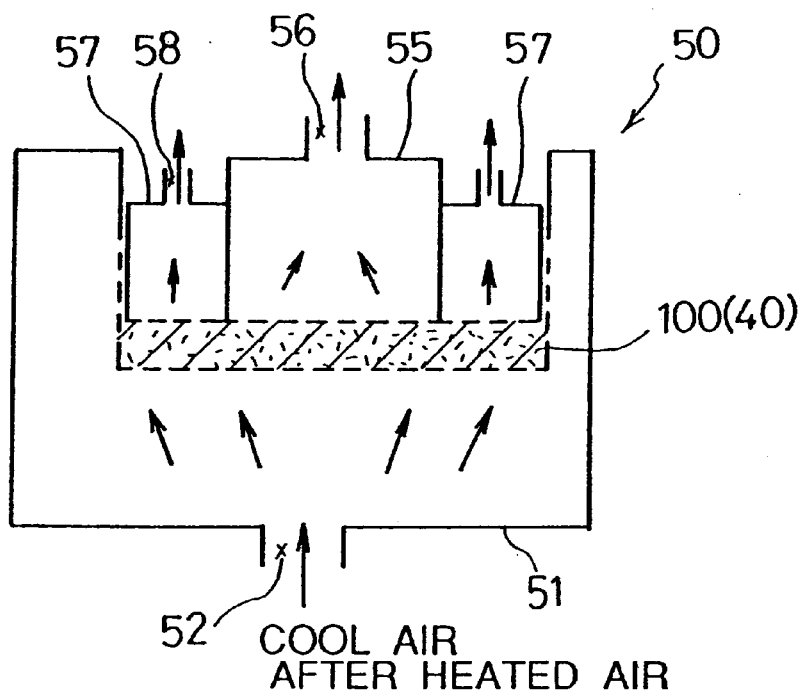
Figure 13:
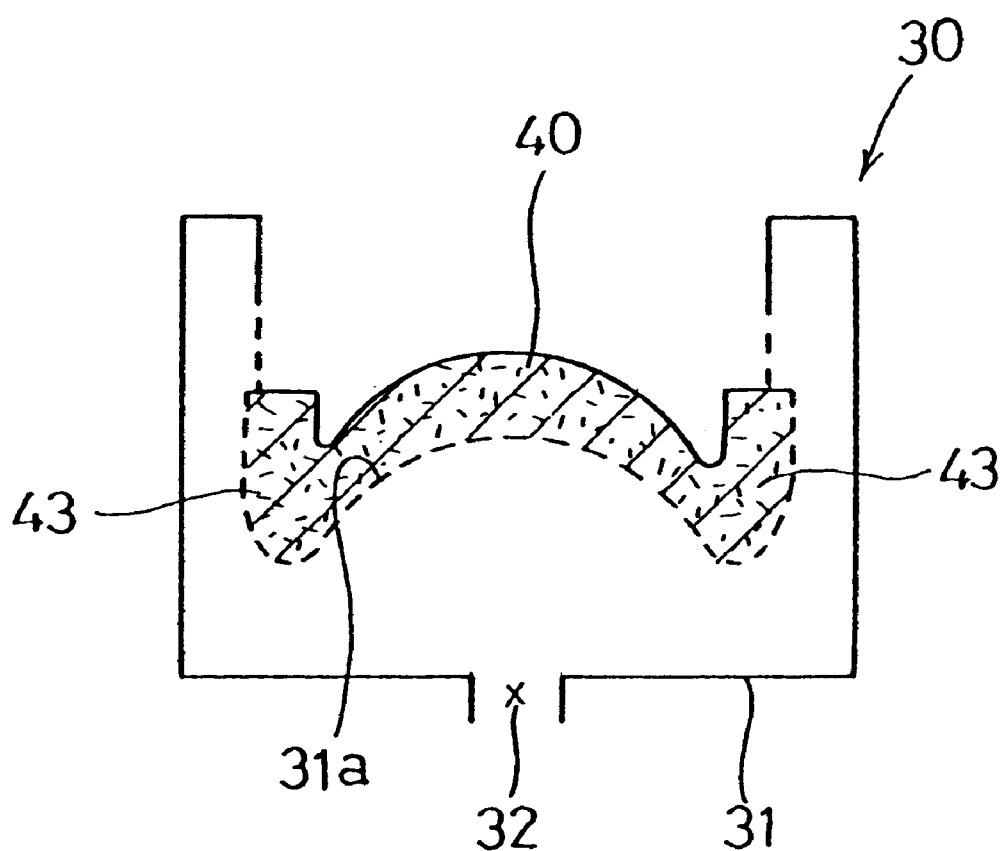
FIG. 13 is an explanatory diagram showing a condition in which the preliminary shaped item is filled into the final shaping die.
Figure 15:
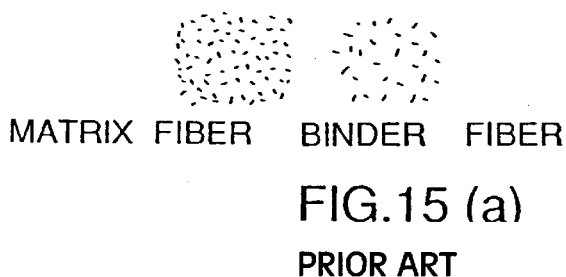
FIGS. 15(a) through 15(e) are explanatory diagrams showing conventional shaping processes of shaping matted fiber material.
Figure 15:
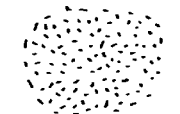
Figure 15:
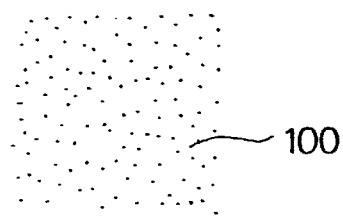
Figure 15:
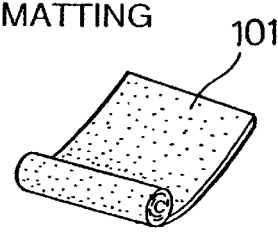
Figure 15:
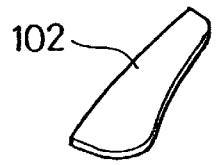

A description will be given on a method of and an apparatus for shaping a fibrous elastic body according to a second preferred embodiment of the present invention, with reference to FIG. 10(*a*) through FIG. 13. The second preferred embodiment comprises a preliminary shaping step of shaping a preliminary shaped item 40 as that shown in FIGS. 11(*a*) through 11(*d*) using a preliminary shaping die 50 as that shown in FIG. 12 as a top die of a preliminary shaping die, as a step prior to the final shaping step of shaping the seat back pad 1. FIG. 11(*a*) is a perspective view as viewed from the front, FIG. 11(*b*) is a perspective view as viewed from the back, FIG. 11(*c*) is a side sectional view, and FIG. 11(*d*) is a plan sectional view. The preliminary shaped item 40 comprises a main portion 42 which will become the general portion 2 of the seat back pad 1, side portions 43 on the left-hand side and the right-hand side to the main portion 42, and a developed top portion 44 which corresponds to the pocketform portion 4 as it is developed above the main portion 42, and has an approximately flat-panel shape which is thicker than the general portion 2. The left-hand and the right-hand side portions 43 of the preliminary shaped item 40, different from the preliminary shaped item 10 according to the first preferred embodiment of the present invention (See FIGS. 3(*a*) through 3(*d*)), are locally clamped with a larger clamping volume than that upon the general portion 2 and the back lining top portion 4, and thereby locally made dense.

Now, the preliminary shaping die 50 which is used for preliminary shaping according to the second preferred embodiment will be described with reference to the side sectional view in FIG. 12(*a*) which shows a condition with the shaping die open and the side sectional view in FIG. 12(*b*) which shows a condition with the shaping die closed. In FIG. 12(*a*), the preliminary shaping die 50 comprises a bottom die 51 which is approximately box-like shaped, a central top die 55, and divided top dies 57 of the left-hand side and the right-hand side. The bottom die 51, the central top die 55, and the left-hand side and the right-hand side divided top dies 57 include a shaping surface 51*a*, a shaping surface 55*a* and a shaping surface 57*a*, respectively, which form the cavity of the preliminary shaped item 40 which is to be shaped with the die closed. The shaping surface 51*a*, the shaping surface 55*a* and the shaping surface 57*a* respectively of the bottom die 51, the central top die 55, and the left-hand side and the right-hand side divided top dies 57, like the shaping surfaces 21*a* and 25*a* of the preliminary shaping die 20 described earlier, are formed by a highly breathable punching metal which includes a number of holes. The shaping surface 51*a* of the bottom die 51 forms a front surface portion of the preliminary shaped item 40. The shaping surface 55*a* of the central top die 55 forms a central back surface portion of the preliminary shaped item 40. The shaping surfaces 57*a* of the left-hand side and the right-hand side divided top dies 57 form back surface portions of the left-hand and the right-hand side portions 43 of the preliminary shaped item 40. The bottom die 51 includes an air supply slot 52 in the bottom surface thereof. Meanwhile, an exhaust slot 56 and an exhaust slot 58 are formed in the top surfaces of the central top die 55 and the left-hand side and the right-hand side divided top dies 57, respectively.

To shape the preliminary shaped item 40 using the preliminary shaping die 50 described above, in FIG. 12(*a*), the fibrillated fiber material 100 is filled into an inner space between the respective top dies 55, 57 and the bottom die 51 which are opened, by air feeding with a pressure feed force or a suction force, in a similar manner to the first preferred embodiment. At this stage, the left-hand side and the right-hand side divided top dies 57 are located at a further elevated position than the central top die 55. As in the first preferred embodiment, in this case as well, since the preliminary shaped item 40 has a simple shape which is close to a rectangular parallelepiped, filling is performed at a constant density distribution while avoiding density shortage or filling shortage which is otherwise caused during filling of the fibrillated fiber material 100 into the preliminary shaping die 50.

Next, in FIG. 12(*b*), the central top die 55 and the left-hand side and the right-hand side divided top dies 57 are closed over the bottom die 51 and the fiber material 100 is clamped. At this stage, since the respective shaping surfaces 55*a* and 57*a* of the central top die 55 and the left-hand side and the right-hand side divided top dies 57 are clamped so as to eventually arrive at approximately the same plane, the left-hand side and the right-hand side divided top dies 57 are clamped more than the central top die 55. Clamping of the central top die 55 is continued until the density of fibrillated fiber material 100 becomes about 0.03 g/cm$^3$, for example. Meanwhile, the left-hand side and the right-hand side divided top dies 57 are clamped until the density of the fibrillated fiber material 100 becomes about 0.04 to 0.05 g/cm$^3$, for example. Next, as in the first preferred embodiment, in the clamping condition described immediately above, heated air is fed inside the bottom die 51 under pressure through the air supply slot 52 of the bottom die 51. After being blown through the fiber material 100, the heated air is discharged outside at the respective exhaust slots 56 and 58 through the central top die 55 and the left-hand side and the right-hand side divided top dies 57. Heated by heated air, the binder fiber which is contained in the fiber material 100 half melts, whereby the matrix fiber is preliminarily shaped in the shape of the preliminary shaped item.

Next, instead of the heated air, cool air is blown through the fiber material 100 which now has the shape of the preliminary shaped item, to thereby cool the fiber material 100 to about 100° C., for example. This solidifies the half melted binder fiber. After this, the shaping die is opened and the shaped item is detached from the shaping die, whereby the preliminary shaped item 40 as that shown in FIG. 11(*a*) is obtained.

As in the first preferred embodiment of the present invention, the preliminary shaped item 40 is finally shaped using the final shaping die 30 into the seat back pad 1 (See FIGS. 2(*a*) through 2(*d*)). During final shaping, as shown in the cross sectional view in FIG. 13, the preliminary shaped item 40 is filled as if pressed into the shaping surface 31*a* of the bottom die 31 of the final shaping die 30 without having the side portions 43 of the left-hand side and the right-hand side folded against the shaping surface 31*a*.

Schematic views showing the shaping steps described above are shown in FIGS. 10(*a*) through 10(*f*). More specifically, FIGS. 10(*a*) through 10(*c*) show the preliminary shaping step, among which FIG. 10(*a*) shows the step of filling the fiber material 100, FIG. 10(*b*) shows the step of heat-clamping and cooling of the fiber material 100, and FIG. 10(*c*) shows the preliminary shaped item 40 as it is after being detached from the shaping die. On the other hand, FIGS. 10(*d*) through 10(*f*) show the final shaping step, among which FIG. 10(*d*) shows the step of filling the preliminary shaped item 40, FIG. 10(*e*) shows the step of heat-clamping and cooling of the preliminary shaped item 40, and FIG. 10(*f*) shows the seat back pad 1 as it is after being detached from the shaping die.

A similar seat back pad 1 to that of the first preferred embodiment is obtained by the method above of shaping the similar seat back pad 1 which is formed by the fibrous elastic body described above. In addition, as the fiber material 100 is clamped with a clamping volume which is locally different during preliminary shaping, it is possible to shape the preliminary shaped item 40 which is locally made dense, and therefore, it is possible to fill the preliminary shaped item 40 into the final shaping die 30 without folding the preliminary shaped item 40 and to create a high-density portion of the seat back pad 1 in an easy manner.

The method of and the apparatus for shaping a fibrous elastic body according to the present invention are not limited to the preferred embodiments described above, but rather, modifications and variations can be devised without departing from the scope of the invention. For instance, the present invention is not limited to the seat back pad 1, but is applicable to shapes produced in general, such as a seat cushion pad, which are formed by other fibrous elastic bodies. Further, instead of a polyester fiber, the fiber material may be other chemical fiber such as a polyamide fiber, an acrylic fiber, a polypropylene fiber and so on.

With the method of and the apparatus for shaping a fibrous elastic body according to the present invention, it is possible to shape an objective article with excellent productivity while avoiding a defective shape due to density shortage, filling shortage, etc.

What is claimed is:

1. An apparatus for shaping a fibrous elastic body made from a fiber material containing a binder fiber that melts when heated, the apparatus comprising:

a preliminary shaping die into which the fiber material is filled to shape a preliminary shaped item which has a preliminary shape of an objective article, said preliminary shaping die including a structure for half melting said binder fiber and a structure for shaping said preliminary shaped item; and a final shaping die in which said preliminary shaped item is filled, heated and clamped so that said preliminary shaped item is shaped into said objective article.

2. The apparatus for shaping a fibrous elastic body in claim 1, wherein said preliminary shaping die has a structure for shaping said preliminary shaped item which has a developed shape of said objective article.

3. The apparatus for shaping a fibrous elastic body in claim 1, wherein said final shaping die has a structure for filling said preliminary shaped item as it is partially folded, so that said objective article is made locally dense.

4. The apparatus for shaping a fibrous elastic body in claim 1, wherein said preliminary shaping die has a structure for clamping said fiber material with a locally different clamping volume.

5. The apparatus for shaping a fibrous elastic body in claim 1;

said preliminary shaping die having a structure for shaping said preliminary shaped item partially into a final objective shape and otherwise into said preliminary shape; and said final shaping die having a structure for shaping a portion of said preliminary shaped item which has said preliminary shape into said final objective shape.

6. The apparatus for shaping a fibrous elastic body in claim 1;

said final shaping die having a structure for filling parts, together with said preliminary shaped item; and said final shaping die having a structure for shaping said parts and said preliminary shaped item simultaneously so that said parts and said preliminary shaped item are integrated with each other.

7. The apparatus for shaping a fibrous elastic body in claim 6, wherein said parts are selected from the group consisting of a backing strip, a front layer pad, an insert wire, and any combination thereof.

8. The apparatus for shaping a fibrous elastic body in claim 1;

said final shaping die having a structure for filling parts, together with said preliminary shaped item with an adhesive agent disposed between said preliminary shaped item and said parts; and said final shaping die having a structure for shaping said parts and said preliminary shaped item simultaneously so that said parts and said preliminary shaped item are integrated with each other.

9. The apparatus for shaping a fibrous elastic body in claim 8, wherein said parts are selected from the group consisting of a backing strip, a front layer pad, an insert wire, and any combination thereof.

10. An apparatus for shaping a fibrous elastic body made from a fiber material containing a binder fiber that melts when heated, the apparatus comprising:

a preliminary shaping die into which the fiber material is filled to shape a preliminary shaped item which has a preliminary shape of an objective article; and a final shaping die in which said preliminary shaped item is filled, heated and clamped so that said preliminary shaped item is shaped into said objective article, said final shaping die including a structure for filling said preliminary shaped item as it is partially folded, so that said objective article is made locally dense.

11. The apparatus for shaping a fibrous elastic body in claim 10, wherein said preliminary shaping die has a structure for half melting said binder fiber and for shaping said preliminary shaped item.

12. The apparatus for shaping a fibrous elastic body in claim 10, wherein said preliminary shaping die has a structure for shaping said preliminary shaped item which has a developed shape of said objective article.

13. The apparatus for shaping a fibrous elastic body in claim 10, wherein said preliminary shaping die has a structure for clamping said fiber material with a locally different clamping volume.

14. The apparatus for shaping a fibrous elastic body in claim 10;

said preliminary shaping die having a structure for shaping said preliminary shaped item partially into a final objective shape and otherwise into said preliminary shape; and said final shaping die having a structure for shaping a portion of said preliminary shaped item which has said preliminary shape into said final objective shape.

15. The apparatus for shaping a fibrous elastic body in claim 10;

said final shaping die having a structure for filling parts; and said final shaping die further having a structure for shaping said parts and said preliminary shaped item simultaneously so that said parts and said preliminary shaped item are integrated with each other.

16. The apparatus for shaping a fibrous elastic body in claim 15, wherein said parts are selected from the group consisting of a backing strip, a front layer pad, an insert wire, and any combination thereof.

17. The apparatus for shaping a fibrous elastic body in claim 10;

said final shaping die having a structure for filling parts, together with said preliminary shaped item with an adhesive agent disposed between said preliminary shaped item and said parts; and said final shaping die having a structure for shaping said parts and said preliminary shaped item simultaneously so that said parts and said preliminary shaped item are integrated with each other.

18. The apparatus for shaping a fibrous elastic body in claim 17, wherein said parts are selected from the group consisting of a backing strip, a front layer pad, an insert wire, and any combination thereof.

* * * * *